United States Patent
An et al.

(10) Patent No.: US 10,944,908 B2
(45) Date of Patent: Mar. 9, 2021

(54) METHOD FOR CONTROLLING CAMERA AND ELECTRONIC DEVICE THEREFOR

(71) Applicant: Samsung Electronics Co., Ltd., Suwon-si (KR)

(72) Inventors: Gyushik An, Gwangju-si (KR); Seungwoo Lee, Yongin-si (KR); Ahron Yang, Gimpo-si (KR); Jaehee Jeon, Seoul (KR); Soyeon Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/328,155

(22) PCT Filed: Jun. 20, 2017

(86) PCT No.: PCT/KR2017/006445
§ 371 (c)(1),
(2) Date: Feb. 25, 2019

(87) PCT Pub. No.: WO2018/043884
PCT Pub. Date: Mar. 8, 2018

(65) Prior Publication Data
US 2019/0199926 A1    Jun. 27, 2019

(30) Foreign Application Priority Data
Aug. 31, 2016 (KR) .......... 10-2016-0111577

(51) Int. Cl.
*H04N 5/222* (2006.01)
*H04N 5/232* (2006.01)
(Continued)

(52) U.S. Cl.
CPC .......... *H04N 5/23245* (2013.01); *G06T 7/80* (2017.01); *H04N 5/225* (2013.01); *H04N 5/2258* (2013.01);
(Continued)

(58) Field of Classification Search
CPC ....... H04N 5/232939; H04N 5/232933; H04N 5/232935; H04N 5/23219; H04N 5/23293; H04N 5/2258
See application file for complete search history.

(56) References Cited

U.S. PATENT DOCUMENTS

| 7,009,722 | B1 | 3/2006 | Nishigaki |
| 2011/0316971 | A1 | 12/2011 | Zhou |

(Continued)

FOREIGN PATENT DOCUMENTS

| CN | 104184944 A1 | 12/2014 |
| CN | 104461288 A | 3/2015 |

(Continued)

OTHER PUBLICATIONS

European Office Action dated Jul. 18, 2019; References #: 3B/2YR28/318; Application #/Patent #: 17846809.6-1208/3506617 PCT/KR2017006445.
(Continued)

*Primary Examiner* — Kelly L Jerabek
(74) *Attorney, Agent, or Firm* — Jefferson IP Law, LLP

(57) ABSTRACT

Various embodiments of the present invention relate to an apparatus and a method for controlling a plurality of cameras in an electronic device. Herein, the electronic device comprises: a first camera; a second camera set to have an angle of view included in an angle of view of the first camera; a display; and a processor, wherein the processor may be configured to display, on the display, a first image acquired through the first camera of the plurality of cameras;
(Continued)

detect information corresponding to the second camera from the first image; activate the second camera, when it is determined to activate the second camera on the basis of the information corresponding to the second camera; and display, on the display, at least one image corresponding to activation of the first camera and the second camera. Other embodiments are also possible.

20 Claims, 49 Drawing Sheets

(51) Int. Cl.
  *G06T 7/80* (2017.01)
  *H04N 5/262* (2006.01)
  *H04N 5/225* (2006.01)
(52) U.S. Cl.
  CPC ......... *H04N 5/232* (2013.01); *H04N 5/23206* (2013.01); *H04N 5/23219* (2013.01); *H04N 5/232935* (2018.08); *H04N 5/262* (2013.01)

(56) References Cited

U.S. PATENT DOCUMENTS

| | | |
|---|---|---|
| 2012/0044372 A1 | 2/2012 | Cote et al. |
| 2014/0132735 A1 | 5/2014 | Lee et al. |
| 2014/0232904 A1 | 8/2014 | Na et al. |
| 2014/0232905 A1 | 8/2014 | Jung et al. |
| 2014/0267842 A1 | 9/2014 | Lee et al. |
| 2014/0361986 A1 | 12/2014 | Won et al. |
| 2015/0207361 A1 | 7/2015 | Jung et al. |
| 2015/0229889 A1 | 8/2015 | Boettiger |
| 2016/0007008 A1 | 1/2016 | Molgaard et al. |
| 2016/0021311 A1 | 1/2016 | Waltermann et al. |
| 2016/0065829 A1 | 3/2016 | Kiso |
| 2016/0316147 A1* | 10/2016 | Bernstein ........... H04N 5/23296 |
| 2017/0026582 A1 | 1/2017 | Kim et al. |
| 2017/0318226 A1* | 11/2017 | Jung ..................... H04N 5/265 |
| 2018/0013955 A1 | 1/2018 | Kim et al. |
| 2018/0144192 A1* | 5/2018 | Kim ........................ G06F 21/32 |
| 2018/0227489 A1* | 8/2018 | Ho ..................... H04N 5/23219 |

FOREIGN PATENT DOCUMENTS

| | | |
|---|---|---|
| CN | 106303258 A | 1/2017 |
| EP | 2 704 417 A1 | 3/2014 |
| EP | 2 985 989 A1 | 2/2016 |
| JP | 2012-227625 A | 11/2012 |
| JP | 2016-046756 A | 4/2016 |
| KR | 10-2008-0090802 A | 10/2008 |
| KR | 10-2011-0044101 A | 4/2011 |
| KR | 10-2012-0048396 A | 5/2012 |
| KR | 10-2014-0062801 A | 5/2014 |
| KR | 10-2014-0104731 A | 8/2014 |
| KR | 10-2014-0114501 A | 9/2014 |
| KR | 10-2015-0087744 A | 7/2015 |
| KR | 10-2016-0019145 A | 2/2016 |
| KR | 10-1633342 B1 | 6/2016 |
| KR | 10-2018-0005543 A | 1/2018 |

OTHER PUBLICATIONS

Chinese Office Action dated Jul. 30, 2020, issued in Chinese Patent Application No. 201780053535.7.

* cited by examiner

METHOD FOR CONTROLLING CAMERA AND ELECTRONIC DEVICE THEREFOR

TECHNICAL FIELD

The disclosure relates to a method and apparatus for controlling a plurality of cameras in an electronic device.

BACKGROUND ART

With the development of information and communication technologies and semiconductor technologies, various types of electronic devices have developed into multimedia devices that provide various multimedia services. The multimedia service may include at least one from among a voice call service, a message service, a broadcasting service, a wireless Internet service, a camera service, a music reproduction service, and the like.

An electronic device may provide various camera services that a user desires using multiple cameras. For example, the electronic device may obtain images of various angles of view using multiple cameras disposed in the back side of the electronic device.

DISCLOSURE OF INVENTION

Technical Problem

An electronic device may obtain an image of an angle of view which a user needs, using multiple cameras having different angles of view. For example, the electronic device may drive at least one camera corresponding to a user input from among the multiple cameras, so as to obtain an image corresponding to an angle of view of the corresponding camera. However, when the electronic device changes a driving camera on the basis of a user input, a delay associated with activation of a camera may occur.

Also, when the electronic device operates multiple cameras in parallel, the multiple cameras need to maintain an activated state continuously and thus, the amount of power consumed by the electronic device may increase, which is a drawback.

According to various embodiments of the disclosure, there is provided a method and apparatus by which an electronic device provides a multi-camera service using multiple cameras.

Solution to Problem

According to various embodiments of the disclosure, an electronic device may include: a first camera; a second camera having an angle of view set to be included in an angle of view of the first camera; a display; and a processor, wherein the processor is configured to perform: displaying a first image obtained via the first camera on the display; detecting information corresponding to the second camera from the first image; activating the second camera when determining to activate the second camera based on the information corresponding to the second camera; and additionally displaying a second image obtained via the second camera on the display.

According to various embodiments of the disclosure, an operation method of an electronic device may include: displaying a first image obtained via a first camera of the electronic device on a display of the electronic device; detecting, from the first image, information corresponding to a second camera configured to have an angle of view included in an angle of view of the first camera; activating the second camera when determining to activate the second camera based on the information corresponding to the second camera; and additionally displaying a second image obtained via the second camera on the display.

Advantageous Effects of Invention

An electronic device and an operation method therefor according to various embodiments may selectively activate a second camera currently operating in an idle mode, on the basis of an image obtained via a first camera, whereby a delay associated with activation of the second camera may be reduced and the amount of power consumed to provide a multi-camera service may be decreased.

BEST MODE FOR CARRYING OUT THE INVENTION

Figure 1A:
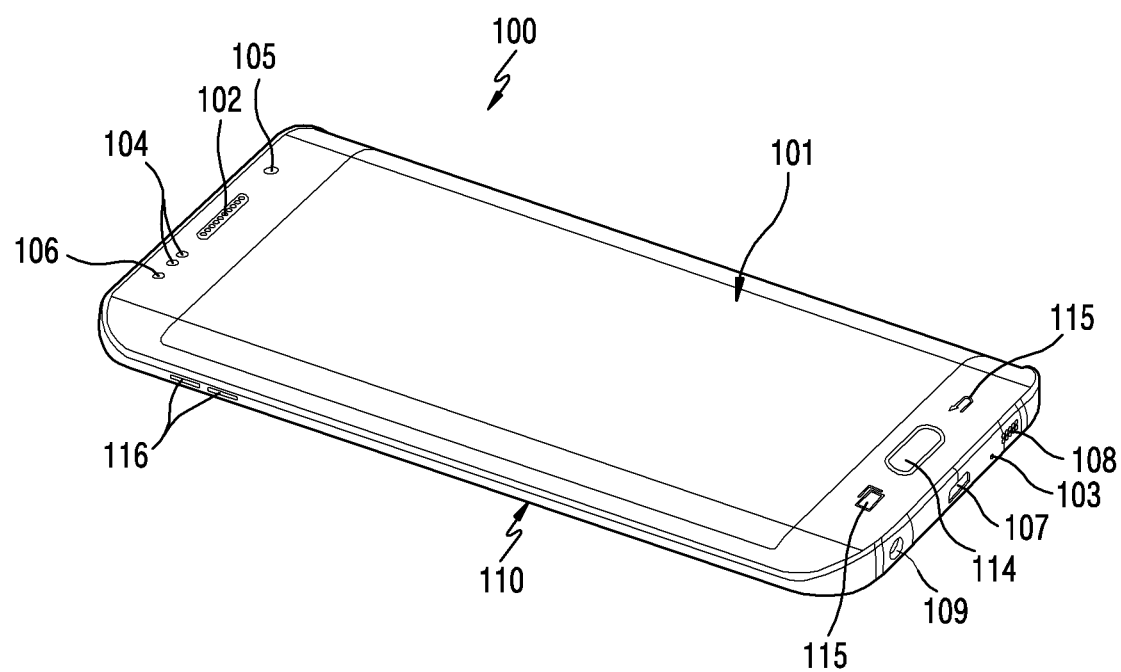
FIG. 1A is a perspective front view of an electronic device according to various embodiments of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context.

As used herein, singular forms may include plural forms as well unless the context clearly indicates otherwise. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to embodiments of the disclosure is not limited to the above-described devices. In the disclosure, the term "user" may indicate a person using an electronic device or a device (e.g., an artificial intelligence electronic device) using an electronic device.

Figure 1B:
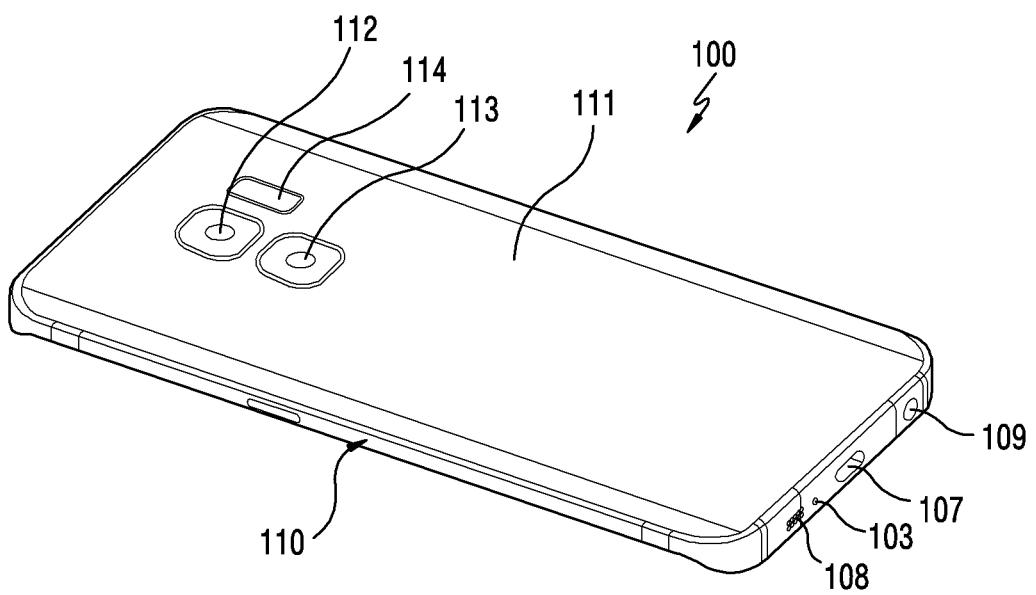
FIG. 1B is a perspective back view of an electronic device according to various embodiments of the disclosure.

FIG. 1A is a perspective front view of an electronic device according to various embodiments of the disclosure. FIG. 1B is a perspective back view of an electronic device according to various embodiments of the disclosure.

Referring to FIGS. 1A and 1B, an electronic device 100 may include a housing 110. According to an embodiment, the housing 110 may include metallic members or may include both metallic members and nonmetallic members. According to an embodiment, a display 101 including a window (e.g., a front window or a glass plate) may be disposed in the front side (e.g., a first side) of the housing 110. According to an embodiment, the electronic device 100 may include a receiver (speaker) 102 to output the voice of a partner. The receiver 102 may be disposed in the housing 110. According to an embodiment, the electronic device 100 may include a microphone device 103 to transmit the voice of a user to a partner. The receiver 103 may be disposed in the housing 110. According to an embodiment, the electronic device 100 may include at least one key input device disposed in the housing 110. For example, the key input device may include a home key button 114 disposed in the front side of the housing 110, touch pads 115 disposed on the right and left of the home key button 114, and a side key button 116 disposed in a lateral side of the housing 110.

According to one embodiment, components for performing various functions of the electronic device 100 may be disposed around the receiver 102. For example, the components may include at least one sensor module 104. For example, the sensor module 104 may include at least one of an illuminance sensor (e.g., an optical sensor), a proximity sensor (e.g., an optical sensor), an infrared sensor, and an ultrasonic sensor. For example, the components may include a front camera device 105. For example, the components may include an indicator 106 (e.g., an LED device) to enable a user to identify state information of an electronic device.

According to an embodiment, a speaker device 108 may be disposed to the side of the microphone device 103. According to an embodiment, an interface connector port 107 may be disposed to the other side of the microphone device 103, and may perform data transmission and reception with an external device and may receive external power to charge the electronic device 100. According to an embodiment, an ear-jack hole 109 may be disposed to the side of the interface connector port 107.

According to an embodiment, the electronic device 100 may include a back side window 111 disposed in the back side (e.g., a second side) of the housing. According to an embodiment, a first camera device 112 and a second camera device 113 may be disposed in the back side window 111. According to an embodiment, at least one electronic component 113 may be disposed to the side of the first camera device 112 and the second camera device 113. For example, the electronic component 113 may include at least one of an illumination sensor (e.g., an optical sensor), a proximity sensor (e.g., an optical sensor), an infrared sensor, an ultrasonic sensor, a heartbeat sensor, and a flash device.

Figure 2A:
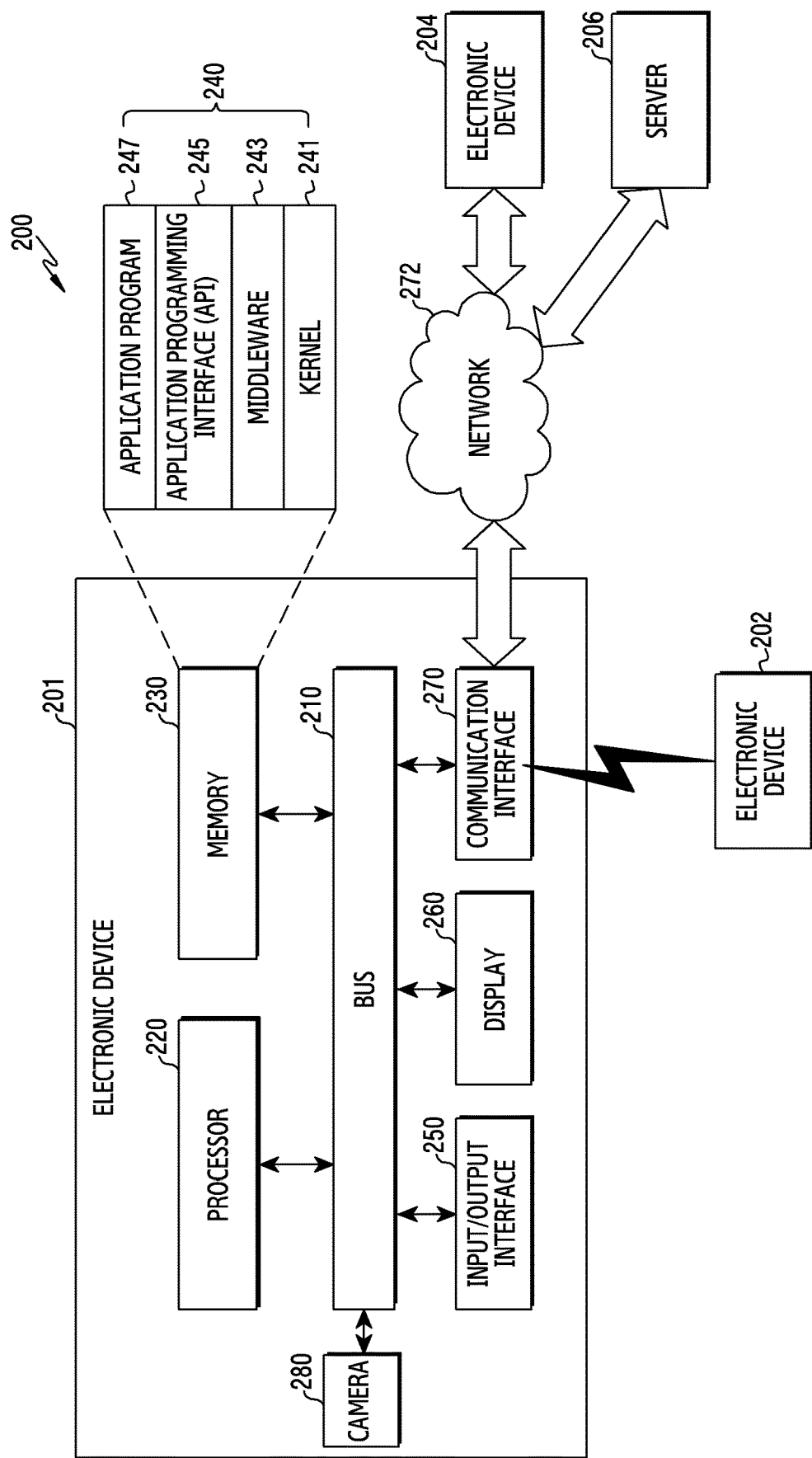
FIG. 2A is a diagram illustrating an electronic device in a network environment according to various embodiments of the disclosure.

FIG. 2A illustrates an electronic device 201 in a network environment 200 according to various embodiments of the disclosure.

Referring to FIG. 2A, the electronic device 201 may include a bus 210, a processor 220, a memory 230, an input/output interface 250, a display 260, a communication interface 270, and a camera 280. In some embodiments, the electronic device 201 may omit at least one of the elements, or may further include other elements.

The bus 210 may include, for example, a circuit that interconnects the elements 220 to 280 and delivers communication (e.g., a control message and/or data) between the elements 220 to 280.

The processor 220 may include one or more of a central processing unit (CPU), an application processor (AP), an image signal processor (ISP), and a communication processor (CP). The processor 220, for example, may carry out operations or data processing relating to control and/or communication of at least one other element of the electronic device 201.

According to an embodiment, the processor 220 may control driving of a second camera using an image obtained via a first camera of the camera 280. For example, the processor 220 may identify a second camera area set in at least a part of the image obtained via the first camera. The processor 220 may determine whether to activate the second camera on the basis of an image attribute of the second camera area. When activation of the second camera is determined, the processor 220 may perform control such that the second camera of the camera 280 is activated. For example, the image attribute of the second camera area may include at least one of face detection information of the second camera area, exposure information (a brightness value) of the second camera area, and focus setting information of the second camera area.

The memory 230 may include volatile and/or non-volatile memory. The memory 230 may store, for example, instructions or data relevant to at least one other element of the electronic device 201. According to an embodiment, the memory 230 may store software and/or a program 240. For example, the program 240 may include a kernel 241, middleware 243, an application programming interface (API) 245, and/or application programs (or "applications") 247. At least some of the kernel 241, the middleware 243, and the API 245 may be referred to as an operating system (OS).

The kernel 241 may control or manage system resources (e.g., the bus 210, the processor 220, or the memory 230) used for executing an operation or function implemented by other programs (e.g., the middleware 243, the API 245, or the applications 247). Furthermore, the kernel 241 may provide an interface via which the middleware 243, the API 245, or the applications 247 may access the individual elements of the electronic device 201 to control or manage the system resources.

The middleware 243 may function as, for example, an intermediary for allowing the API 245 or the applications 247 to communicate with the kernel 241 to exchange data. Furthermore, the middleware 243 may process one or more task requests received from the applications 247 according to the priorities thereof. For example, the middleware 243 may assign priorities to use the system resources (e.g., the bus 210, the processor 220, the memory 230, or the like) of the electronic device 201 to one or more of the applications 247, and may process the one or more task requests. The API 245 is an interface used by the applications 247 to control a function provided from the kernel 241 or the middleware 243, and may include, for example, at least one interface or function (e.g., an instruction) for file control, window control, image processing, character control, or the like.

The input/output interface 250 may function as, for example, an interface that can forward commands or data, which are input from a user or an external device, to the other element(s) of the electronic device 201.

The display 260 may include, for example, a liquid crystal display (LCD), a light emitting diode (LED) display, an organic light emitting diode (OLED) display, a micro electro mechanical system (MEMS) display, or an electronic paper display. The display 260 may display, for example, various types of content (e.g., text, images, videos, icons, and/or symbols) for a user. The display 260 may include a touch screen and may receive, for example, a touch, gesture, proximity, or hovering input using an electronic pen or the user's body part.

The communication interface 270 may establish communication, for example, between the electronic device 201 and an external device (e.g., a first external electronic device 202, a second external electronic device 204, or a server 206). For example, the communication interface 270 may be connected to a network 272 via wireless or wired communication to communicate with an external device (e.g., the second external electronic device 204 or the server 206).

The wireless communication may include, for example, cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi, light fidelity (Li-Fi), Bluetooth, Bluetooth low energy (BLE), ZigBee, near field communication (NFC), magnetic secure transmission, radio frequency (RF), and body area network (BAN). According to an embodiment, the wireless communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a universal serial bus (USB), a high definition multimedia interface (HDMI), recommended standard 232 (RS-232), a plain old telephone service (POTS), and the like. The network 272 may include a telecommunications network, for example, at least one of a computer network (e.g., a LAN or a WAN), the Internet, and a telephone network.

Each of the first and second external electronic devices 202 and 204 may be of a type that is the same or different from that of the electronic device 201. According to various embodiments, all or some of the operations executed in the electronic device 201 may be executed in another electronic device or a plurality of electronic devices (e.g., the electronic devices 202 and 204 or the server 206). According to an embodiment, when the electronic device 201 has to perform some functions or services automatically or in response to a request, the electronic device 201 may make a request for performing at least some functions relating thereto to another device (e.g., the electronic device 202 or 204 or the server 206) in addition to, or instead of, performing the functions or services. Another electronic device (e.g., the electronic device 202 or 204, or the server 206) may execute the requested functions or the additional functions, and may deliver the result thereof to the electronic device 201. The electronic device 201 may provide the received result as it is, or may additionally process the received result to provide the requested functions or services. To this end, for example, cloud computing, distributed computing, or client-server computing technology may be used.

The camera 280 may collect image information associated with a subject. For example, the camera 280 may include multiple camera modules included in the electronic device 201. For example, the camera 280 may include a first camera and a second camera to shoot a subject located in front of a user. The first camera and the second camera have different angles of view used for obtaining images, and the angle of view of the second camera may overlap at least a part of the angle of view of the first camera. Additionally or alternatively, the camera 280 may further include a camera (e.g., a front camera device) for performing shooting in a self-portrait mode. For example, the camera 280 may include an image sensor such as a charge-coupled device (CCD) sensor, a complementary metal-oxide-semiconductor (CMOS) sensor, and the like.

Figure 2B:
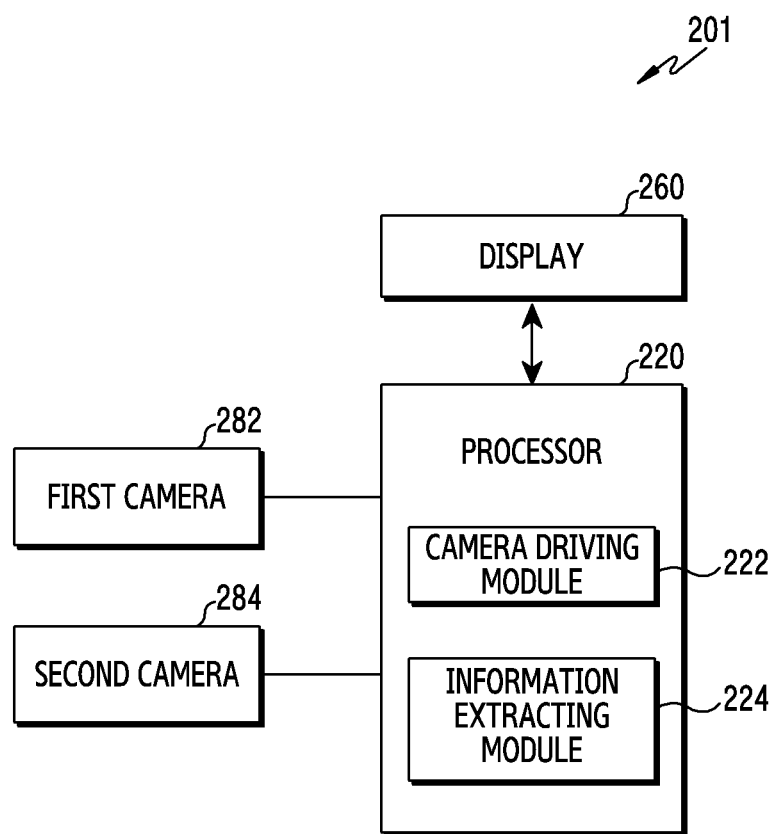
FIG. 2B is a block diagram of an electronic device including multiple cameras according to various embodiments of the disclosure.

FIG. 2B is a block diagram of an electronic device including multiple cameras according to various embodiments of the disclosure.

Referring to FIG. 2B, an electronic device 201 may include a processor 220, a display 260, a first camera 282, and a second camera 284.

According to an embodiment, the first camera 282 and the second camera 284 may be disposed to be close to each other in one side (e.g., the back side) of the electronic device 201. For example, the first camera 282 and the second camera 284 may be disposed to be close to each other in the vertical direction or in the horizontal direction, in the back side of the electronic device 201. For example, the angle of view of the first camera 282 may be set to be wider than the angle of view of the second camera 284, and the angle of view of the second camera 284 may be included in the angle of view of the first camera 282.

According to an embodiment, when the electronic device 201 operates in a multi-camera mode, the first camera 282 may continuously maintain an activated state. According to an embodiment, when the electronic device 201 operates in the multi-camera mode, the second camera 284 may be selectively activated. For example, when the use of the second camera 284 is restricted in the multi-camera mode, the second camera 284 may operate in an idle mode. When the processor 220 determines to change the second camera 284 to an activation mode, the second camera 284 may be changed to the activation mode. For example, the idle mode of the second camera 284 may include an operation state that maintains the initial setting for activating the second camera 284, and deactivates an image sensor of the second camera 284. The initial setting for activating the second camera 284 may include generating an instance, allocating memory, reading, from the memory 230, a setting parameter for operating a camera, or the like. The activation mode of the second camera 284 may include an operation state that activates the image sensor of the second camera 284 so as to obtain an image.

According to an embodiment, the processor 220 may control driving of the first camera 282 and the second camera 284 via a camera driving module 222 and an information extracting module 224. For example, when the electronic device 201 operates in the multi-camera mode, the camera driving module 222 may perform control such that the first camera 282 is activated and the second camera 284 operates in the idle mode. The information extracting module 224 may detect an image attribute of a second camera area from an image obtained via the first camera 282. The camera driving module 222 may determine whether to activate the second camera 284 on the basis of the image attribute of the second camera area provided from the information extracting module 224. For example, the image attribute of the second camera area may include at least one of face detection information of the second camera area, exposure information (a brightness value) of the second camera area, and focus information associated with an object included in the second camera area. The second camera area may include at least a part corresponding to the angle of view of the second camera 284, in the image obtained via the first camera 282.

According to an embodiment, the processor 220 may set the second camera area in the image obtained via the first camera 282. For example, when it is detected that an area matching event occurs, the processor 220 may detect an area corresponding to an image obtained via the second camera 284 from the image obtained via the first camera 282. The processor 220 may set the area corresponding to the image obtained via the second camera 284 in the image obtained via the first camera 282, as the second camera area. For example, the area matching event may occur periodically, or by a user input.

According to an embodiment, the processor 220 may restrict driving of the second camera 284 on the basis of the distance to a subject. For example, the processor 220 may estimate the distance to an object on which focus is set in the image provided from the first camera 282. For example, the processor 220 may estimate the distance to an object on which focus is set, using the first camera 282 or a separate sensor. When the object on which focus is set exists within a reference distance, the processor 220 may restrict driving of the second camera 284. For example, the processor 220 may perform control using the camera driving module 222, such that the second camera 284 maintains the idle mode or the second camera 284 is deactivated. Additionally or alternatively, when the object on which focus is set exists within the reference distance from the electronic device 201, the processor 220 may deactivate the multi-camera mode of the electronic device 201.

According to an embodiment, the processor 220 may capture an image using at least one of the first camera 282 and the second camera 284 on the basis of the type of a capture event in the multi-camera mode. For example, when it is detected that a first capture event occurs, the processor 220 may capture an image using the first camera 282. For example, when it is detected that a second capture event occurs, the processor 220 may capture an image using the second camera 284. For example, when it is detected that a third capture event occurs, the processor 220 may capture images using the first camera 282 and the second camera 284. In this instance, the processor 220 may store the image captured via the first camera 282 and the image captured via the second camera 284 separately, or may combine them as a single image and store the image. For example, the processor 220 may classify the types of capture events on the basis of at least one of a gesture for capture, the strength of pressure, a touch duration, the number of touches, and a capture icon type, and the like.

According to an embodiment, the processor 220 may control the angle of view of the second camera 284. For example, the processor 220 may control the angle of view of the second camera 284 to correspond to a user input detected via the input/output interface 250. For example, the processor 220 may identify an object on which focus is set in the image provided from the second camera 284. The processor 220 may control the angle of view of the second camera 284 on the basis of the size of the object on which focus is set. For example, the processor 220 may perform control so as to narrow the angle of view of the second camera 284 to correspond to the size of the object on which focus is set in the image obtained via the second camera 284.

According to an embodiment, the processor 220 may independently control a zoom function of the first camera 282 and the second camera 284 in the multi-camera mode. For example, when the first camera 282 and the second camera 284 are activated, the processor 220 may control the display 260 so as to display a first image obtained via the first camera 282 and a second image obtained via the second camera 284. For example, the processor 220 may control the display 260 so as to display the second image obtained via the second camera 284 in at least a part of the first image obtained via the first camera 282. When a user input corresponding to a zoom function is detected in the second camera area of the first image, the processor 220 may control the second camera 284 so as to perform the zoom function corresponding to the user input. When a user input corresponding to a zoom function is detected outside the second camera area of the first image, the processor 220 may control the first camera 282 so as to perform the zoom function corresponding to the user input.

The display 260 may display an image provided from at least one of the first camera 282 and the second camera 284. For example, when the first camera 282 and the second camera 284 are activated, the display 260 may separately display a first image obtained via the first camera 282 and a second image obtained via the second camera 284. For example, the display 260 may display the second image obtained via the second camera 284 in at least a part of the first image obtained via the first camera 282, like a picture in picture (PIP) manner. For example, the display 260 may display the first image obtained via the first camera 282 and the second image obtained via the second camera 284 in different areas. For example, when the second camera 284 operates in the idle mode in the multi-camera mode, the display 260 may display the first image obtained via the first camera 282. For example, when only the second camera 284 is activated, the display 260 may display the second image obtained via the second camera 284.

Figure 2C:
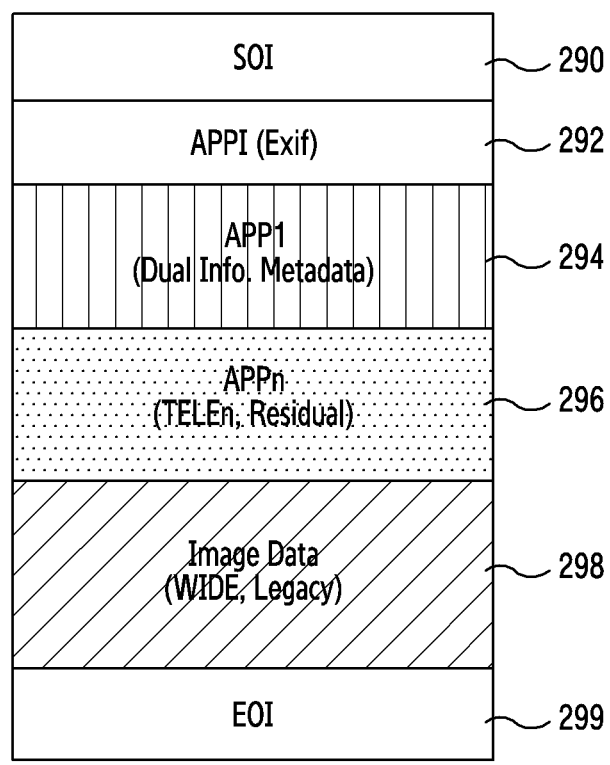
FIG. 2C is a diagram illustrating the configuration of data captured using multiple cameras according to various embodiments of the disclosure.

According to various embodiments of the disclosure, when the electronic device 201 captures an image using multiple cameras, the electronic device 201 may distinguish a first shooting for backward compatibility and basic reproduction, and a second shooting by using zooming-in/out. For example, the first shooting may modify an image obtained via the image sensor of the first camera 282 into data (bayer data) in a form for transmission to a processor for image processing. The first shooting may include an image capturing sequence that performs image signal processing (ISP) of the data (bayer data) obtained from modification, and encodes the same into an image format (e.g., JPEG) as shown in FIG. 2C. For example, the second shooting may modify an image obtained via the image sensor of the second camera 284 into data (bayer data) in a form for transmission to a processor for image processing. The second shooting performs ISP of data (bayer data) obtained from modification. As shown in FIG. 2C, a first shot image and a second shot image may include an image capturing sequence for encoding the images into a single image format (e.g., JPEG), as opposed to storing the images as separate image formats.

FIG. 2C is a diagram illustrating the configuration of data captured using multiple cameras according to various embodiments of the disclosure.

According to an embodiment, when the electronic device 201 captures images using multiple cameras in the multi-camera mode, the electronic device 201 may store data provided in the structure of FIG. 2C. For example, the electronic device 201 may configure information of images (e.g., additional information associated with a plurality of images and metadata) obtained via multiple cameras in the multi-camera mode, using an APPn marker code that allows a JPEG extension. For example, a captured image of the multi-camera mode may include a start of image (SOI) 290 indicating the start of the image, a marker code (APP1) 292 and 294 including additional information of the image, a marker code (APPn) 296 to which multiple images captured using multiple cameras are allocated, an image data field 298 including image data obtained via at least one camera, and an end of image (EOI) 299 indicating the end of the image. Additionally or alternatively, image information of the multi-camera mode may have a hierarchical structure using various zooming-in/out, and may be allocated via a separate space in the same file, as shown in diagram 296 and 298.

According to an embodiment, metadata of the APP1 field 294 may include various parameter information of the multi-camera mode, such as a zoom magnification of an image obtained via the multi-camera mode, offset designation, and the like. For example, the parameter of the multi-camera mode may be expressed by various forms such as an integer, a floating point, an ASCII, and the like. Also, the parameter of the multi-camera mode may be extensible to a tagged image file format (TIFF), an extensible metadata platform (XMP), and the like, as a technology for exchanging data. According to an embodiment, the electronic device 201 needs a relatively large amount of memory in order to store images captured using multiple cameras in the multi-camera mode. Accordingly, the electronic device 201 may need a data compression codec suitable for a scenario that utilizes an image captured in the multi-camera mode. For example, images of the multi-camera mode at the same angle of view may include a lot of overlapping visual components based on a zoom function. Accordingly, the processor 220 may reduce the overlapping visual properties based on a zoom function, and may change the configuration to include data having low entropy, whereby the amount of data may be reduced, as shown in diagram 296. For example, the processor 220 may use differential pulse-code modulation (DPCM), motion estimation/motion compensation (ME/MC), and the like as a compression technology for reducing the amount of data.

According to an embodiment, the electronic device 201 may efficiently control various scenarios using the single file configuration of the multi-camera mode as shown in FIG. 2C, which is efficient for file management. Also, the electronic device 201 may guarantee backward compatibility and may perform reproduction via playback equipment such as a smart phone, a TV, and the like without any limitation, and may support various effects using multiple cameras via various user interfaces such as a touch input and the like.

Figure 3:
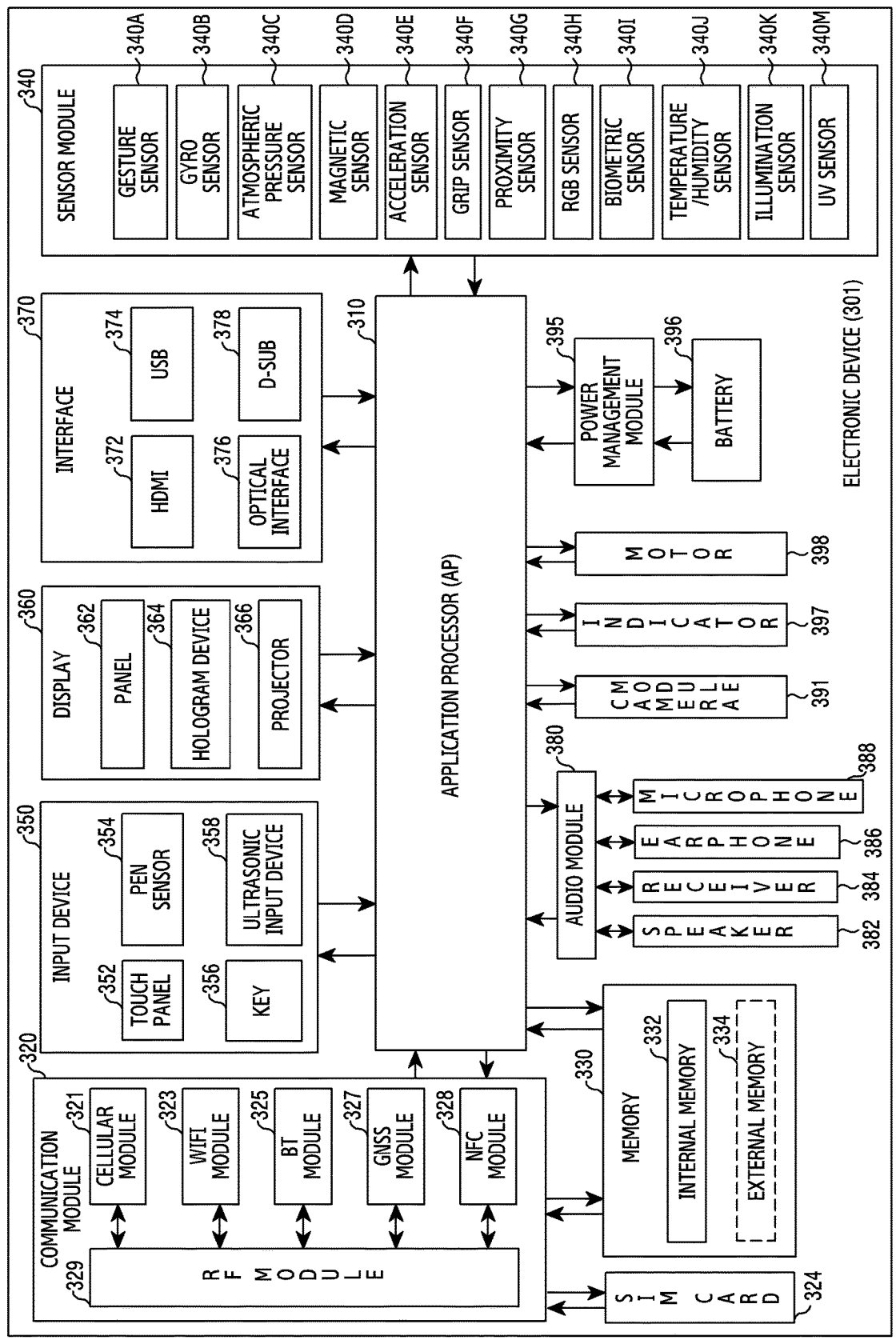
FIG. 3 is a block diagram of an electronic device according to various embodiments of the disclosure.

FIG. 3 is a block diagram of an electronic device 301 according to various embodiments of the disclosure. The electronic device 301 may include, for example, the whole or a part of the electronic device 201 illustrated in FIG. 2.

Referring to FIG. 3, the electronic device 301 may include at least one processor (e.g., AP) 310, a communication module 320, a subscriber identification module 324, a memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software elements connected thereto and may perform various data processing and operations by driving an operating system or an application program. The processor 310 may be implemented as, for example, a system on chip (SoC). According to an embodiment, the processor 310 may further include a graphic processing unit (GPU) and/or an image signal processor (ISP). The processor 310 may also include at least some of the elements illustrated in FIG. 3 (e.g., a cellular module 321). The processor 310 may load, in volatile memory, commands or data received from at least one of the other elements (e.g., non-volatile memory), may process the loaded commands or data, and may store the result data in the non-volatile memory.

According to an embodiment, the processor 210 may determine whether to activate a second camera of the electronic device 301 on the basis of an image attribute of at least a part (second camera area) of an image obtained via a first camera of the electronic device 301.

The communication module 320 may have a configuration equal or similar to that of the communication interface 270 of FIG. 2. The communication module 320 may include, for example, a cellular module 321, a Wi-Fi module 323, a Bluetooth module 325, a GNSS module 327, an NFC module 328, and an RF module 329.

The cellular module 321 may provide, for example, a voice call, a video call, a text message service, an Internet service, or the like via a communication network. According to an embodiment, the cellular module 321 may identify and authenticate the electronic device 301 within a communication network using the subscriber identification module 324 (e.g., a SIM card). According to an embodiment, the cellular module 321 may perform at least some of the functions that the processor 310 may provide. According to an embodiment, the cellular module 321 may include a communication processor (CP).

According to some embodiments, at least some (e.g., two or more) of the cellular module 321, the Wi-Fi module 323, the BT module 325, the GNSS module 327, and the NFC module 328 may be included in one integrated chip (IC) or IC package.

The RF module 329 may transmit or receive, for example, a communication signal (e.g., an RF signal). The RF module 329 may include, for example, a transceiver, a power amp module (PAM), a frequency filter, a low noise amplifier (LNA), an antenna, or the like. According to another embodiment, at least one of the cellular module 321, the Wi-Fi module 323, the BT module 325, the GNSS module 327, and the NFC module 328 may transmit or receive an RF signal via a separate RF module. The subscriber identification module 324 may include, for example, a card that includes a subscriber identity module or an embedded SIM, and may contain unique identification information (e.g., an integrated circuit card identifier (ICCID)) or subscriber information (e.g., an international mobile subscriber identity (IMSI)).

The memory 330 (e.g., the memory 230 of FIG. 2) may include, for example, an embedded memory 332 or an external memory 334. The embedded memory 332 may include, for example, at least one of volatile memory (e.g., DRAM, SRAM, SDRAM, or the like) and non-volatile memory (e.g., one-time programmable ROM (OTPROM), PROM, EPROM, EEPROM, mask ROM, flash ROM, flash memory, a hard disc drive, or a solid state drive (SSD)). The external memory 334 may include a flash drive, for example, a compact flash (CF), a secure digital (SD), a micro-SD, a mini-SD, an extreme digital (xD), a multi-media card (MMC), a memory stick, and the like. The external memory 334 may be functionally or physically connected to the electronic device 301 via various interfaces.

The sensor module 340 may, for example, measure a physical quantity or detect the operating state of the electronic device 301, and may convert the measured or detected information into an electrical signal. The sensor module 340 may include, for example, at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a red, green, and blue (RGB) sensor), a biometric sensor 340I, a temperature/humidity sensor 340J, an illumination sensor 340K, and a ultraviolet (UV) sensor 340M. Additionally or alternatively, the sensor module 340 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit for controlling one or more sensors included therein. In some embodiments, the electronic device 301 may further include a processor configured to control the sensor module 340, as a part of or separately from the processor 310, and may control the sensor module 340 while the processor 310 is in a sleep state. For example, the temperature/humidity sensor 340J may include a plurality of temperature sensors disposed in different locations.

The input device 350 may include, for example, a touch panel 352, a (digital) pen sensor 354, a key 356, or an ultrasonic input device 358. The touch panel 352 may use, for example, at least one of a capacitive type, a resistive type, an infrared type, and an ultrasonic type. Furthermore, the touch panel 352 may further include a control circuit. The touch panel 352 may further include a tactile layer to provide a tactile reaction to a user. The (digital) pen sensor 354 may include, for example, a recognition sheet that is a part of, or separate from, the touch panel. The key 356 may include, for example, a physical button, an optical key, or a keypad. The ultrasonic input device 358 may detect ultrasonic waves, which are generated by an input tool, via a microphone (e.g., a microphone 388) to identify data corresponding to the detected ultrasonic waves.

The display 360 (e.g., the display 260 of FIG. 2) may include a panel 362, a hologram device 364, a projector 366, and/or a control circuit for controlling them. The panel 362 may be implemented to be, for example, flexible, transparent, or wearable. The panel 362, together with the touch panel 352, may be configured as one or more modules. The hologram device 364 may show a three dimensional image in the air using light interference. The projector 366 may display an image by projecting light onto a screen. The screen may be located, for example, inside or outside the electronic device 301. The interface 370 may include, for example, an HDMI 372, a USB 374, an optical interface 376, or a D-subminiature (D-sub) 378. The interface 370 may be included in, for example, the communication interface 270 illustrated in FIG. 2. Additionally or alternatively, the interface 370 may include, for example, a mobile high-definition link (MHL) interface, a secure digital (SD) card/ multi-media card (MMC) interface, or an infrared data association (IrDA) standard interface.

The audio module 380 may convert, for example, sound into an electrical signal, and vice versa. At least some elements of the audio module 380 may be included, for example, in the input/output interface 250 illustrated in FIG. 2. The audio module 380 may process sound information that is input or output via, for example, a speaker 382, a receiver 384, earphones 386, the microphone 388, and the like.

The camera module 391 (e.g., the camera 280 of FIG. 2) is a device capable of shooting a still image and a moving image. According to an embodiment, the camera module 391 may include one or more image sensors (e.g., a front sensor or a rear sensor), a lens, an image signal processor (ISP), or a flash (e.g., an LED or xenon lamp). The power management module 395 may manage, for example, the power of the electronic device 301.

The power management module 395 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (e.g., a coil loop, a resonance circuit, a rectifier, and the like) for wireless charging may be further included. A battery gauge may measure, for example, the amount of charge remaining in the battery 396 and a voltage, current, or temperature while charging. The battery 396 may include, for example, a rechargeable battery and/or a solar battery.

The indicator 397 may display a particular state, for example, a booting state, a message state, a charging state, or the like of the electronic device 301 or a part (e.g., the processor 310) of the electronic device 301. The motor 398 may convert an electrical signal into a mechanical vibration and may generate a vibration, haptic effect, or the like. The electronic device 301 may include a mobile TV support device (e.g., GPU) capable of processing media data according to a standard, such as digital multimedia broadcasting (DMB), digital video broadcasting (DVB), mediaFlo™, and the like.

Each of the above-described elements described in the disclosure may be configured with one or more components, and the names of the corresponding elements may be different according to an electronic device type. In various embodiments, an electronic device (e.g., the electronic device 301) may omit some elements or may further include additional elements, or some of the elements of the electronic device may be combined with each other to configure one entity, in which case the electronic device may equally perform the functions of the corresponding elements prior to the combination.

According to various embodiments, an electronic device may include a first camera, a second camera having an angle of view set to be included in an angle of view of the first camera, a display, and a processor. The processor is configured to perform: displaying a first image obtained via the first camera on the display; detecting information corresponding to the second camera from the first image; activating the second camera when determining to activate the second camera based on the information corresponding to the second camera; and displaying, on the display, at least one object corresponding to activation of the first camera and the second camera.

According to various embodiments, when a multi-camera mode is set, the processor performs control such that the first camera is activated and the second camera operates in an idle mode.

According to various embodiments, when determining to activate the second camera, the processor performs control so as to activate the second camera that currently operates in the idle mode.

According to various embodiments, the processor is configured to perform: detecting an image attribute of an area corresponding to the angle of view of the second camera from the first image obtained via the first camera; and determining whether to activate the second camera based on the image attribute.

According to various embodiments, the image attribute may include at least one from among face detection information of the area corresponding to the angle of view of the second camera, exposure information (a brightness value) of the area corresponding to the angle of view of the second camera, and focus information of an object included in the area corresponding to the angle of view of the second camera.

According to various embodiments, the processor performs control so as to perform: detecting a face of an object from the first image obtained via the first camera; determining a validity of a facial area of the object detected from an area corresponding to the angle of view of the second camera when the facial area of the object detected from the area corresponding to the angle of view of the second camera exists in the first image; and activating the second camera when determining that the facial area of the object detected from the area corresponding to the angle of view of the second camera is valid.

According to various embodiments, the processor performs control so as to perform: identifying a brightness value of an area corresponding to the angle of view of the second camera in the first image; and activating the second camera when a difference in brightness value between the area corresponding to the angle of view of the second camera and a remaining area exceeds a reference value.

According to various embodiments, the processor performs control so as to perform: identifying whether an object on which focus is set exists in an area corresponding to the angle of view of the second camera in the first image obtained via the first camera; and activating the second camera when the object on which the focus is set exists in the area corresponding to the angle of view of the second camera.

According to various embodiments, when the second camera is activated, the processor is configured to modify a form of a capture icon so as to correspond to the activation of the first camera and the second camera.

According to various embodiments, the first camera and the second camera are disposed to be close to each other in the same side of the electronic device.

Figure 4:
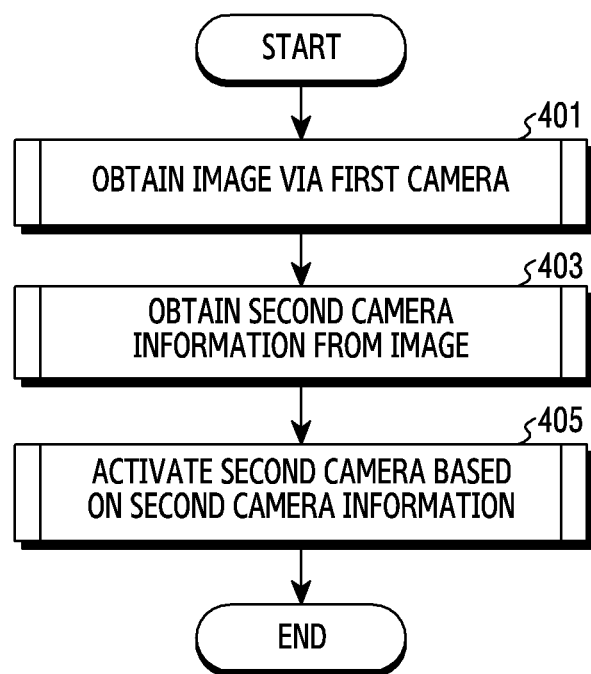
FIG. 4 is a flowchart illustrating a process of providing a multi-camera service by an electronic device according to various embodiments of the disclosure.

FIG. 4 is a flowchart illustrating a process of providing a multi-camera service by an electronic device according to various embodiments of the disclosure. Hereinafter, the electronic device may include the whole or a part (e.g., the processor 220) of the electronic device 201 illustrated in FIGS. 2A and 2B.

Referring to FIG. 4, the electronic device may obtain an image via a first camera of the electronic device in operation 401. For example, the processor 220 may control the display 26 so as to display a preview image obtained via the first camera 282 that is electrically connected to the electronic device 201. In this instance, the processor 220 may perform control such that the second camera 284 that is electrically connected to the electronic device 201 operates in an idle mode.

The electronic device may obtain information corresponding to a second camera from the image obtained via the first camera in operation 403. For example, the processor 220 may identify at least a part corresponding to a second camera area in a first image obtained via the first camera 282. The processor 120 may detect an image attribute associated with at least a part corresponding to the second camera area. For example, the image attribute of the second camera area may include at least one of face detection information of the second camera area, exposure information (a brightness value) of the second camera area, and focus information associated with an object included in the second camera area.

In operation 405, the electronic device may activate the second camera on the basis of information corresponding to the second camera which is detected from the image obtained via the first camera. For example, the processor 220 may determine whether the face of a subject is detected from the second camera area of the image obtained via the first camera 282. When a facial area of the subject detected from the second camera area is valid, the processor 220 may perform control so as to activate the second camera 284. For example, the processor 220 may determine the validity of the facial area of the subject on the basis of the size of the facial area of the subject. For example, the processor 220 may determine whether a difference in brightness value exists between the second camera area and the remaining area of the image obtained via the first camera 282. When the difference in brightness value between the second camera area and the remaining area of the image obtained via the first camera 282 is greater than a reference value, the processor 220 may perform control so as to activate the second camera 284. For example, when a subject on which focus is set exists in the second camera area of the image obtained via the first camera 282, the processor 220 may perform control so as to activate the second camera 284. For example, the second camera area may include at least a part corresponding to the angle of view of the second camera 284 in the image obtained via the first camera 282.

Figure 5:
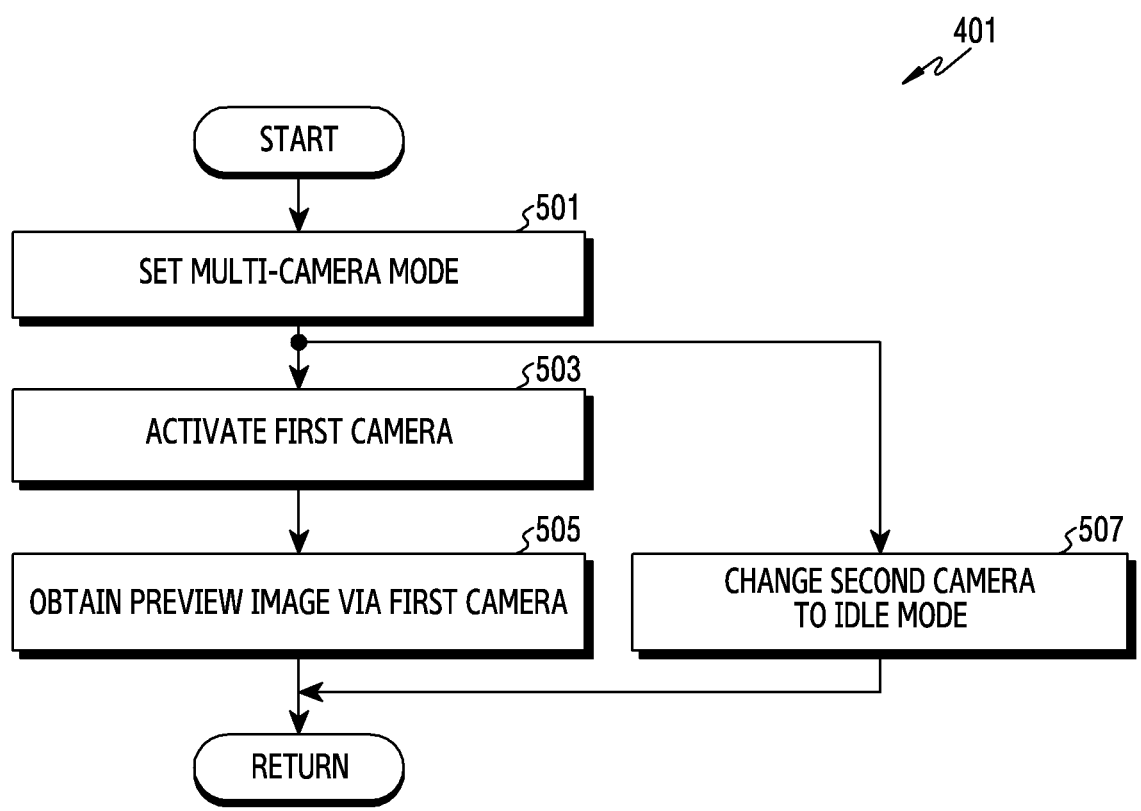
FIG. 5 is a flowchart illustrating a process of controlling multiple cameras by an electronic device according to various embodiments of the disclosure.

FIG. 5 is a flowchart illustrating a process of controlling multiple cameras by an electronic device according to various embodiments of the disclosure. Hereinafter, the operation of obtaining the image via the first camera performed in operation 401 of FIG. 4 will be described in detail. Hereinafter, the electronic device may include the whole or a part (e.g., the processor 220) of the electronic device 201 illustrated in FIGS. 2A and 2B.

Referring to FIG. 5, in operation 501, the electronic device may set a multi-camera mode in order to drive the first camera and the second camera in parallel. For example, the processor 220 may set the activation menu of the multi-camera mode on the basis of a user input detected via the input/output interface 250. For example, the user input may include at least one of an input for selecting a multi-camera mode icon and a gesture input corresponding to a multi-camera mode. For example, the processor 220 may execute the multi-camera mode on the basis of the feature of an application currently executed in the electronic device 201.

When the multi-camera mode is set, the electronic device may activate the first camera of the electronic device in operation 503. For example, the processor 220 may perform initial setting of the first camera 282, and may activate an image sensor of the first camera 282.

The electronic device may obtain a preview image via the first camera in operation 505. For example, the processor 220 may perform control so as to display the preview image obtained via the image sensor of the first camera 282 on at least a part of the display 260.

When the multi-camera mode is set, the electronic device may operate the second camera of the electronic device in the idle mode in operation 507. For example, the processor 220 may perform initial setting of the second camera 284, and may control the second camera 284 such that the image sensor of the second camera 284 maintains a deactivated state. For example, the initial setting may include generating an instance associated with the second camera 284, allocating memory for driving the second camera 284, reading, from the memory 230, a setting parameter for operating a camera, or the like.

Figure 6:
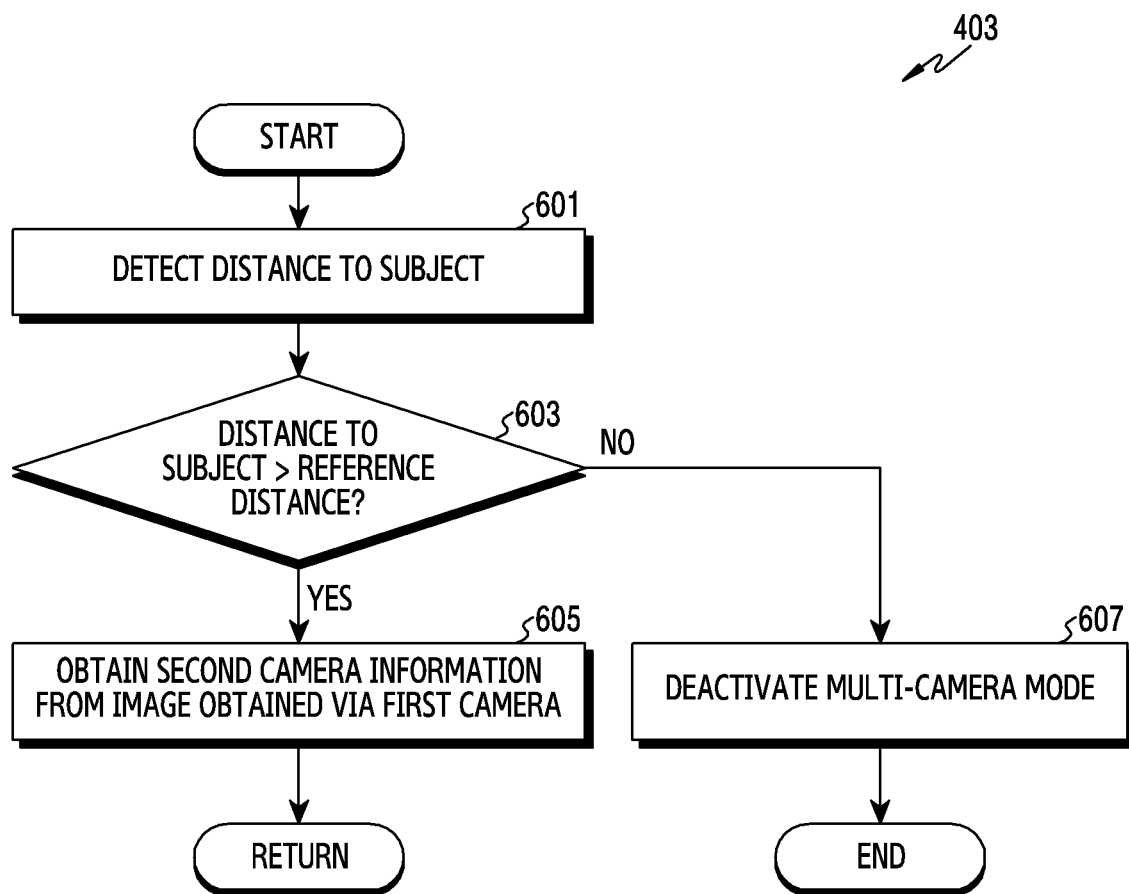
FIG. 6 is a flowchart illustrating a process of controlling a multi-camera service on the basis of the distance to a subject by an electronic device according to various embodiments of the disclosure.
Figure 7:
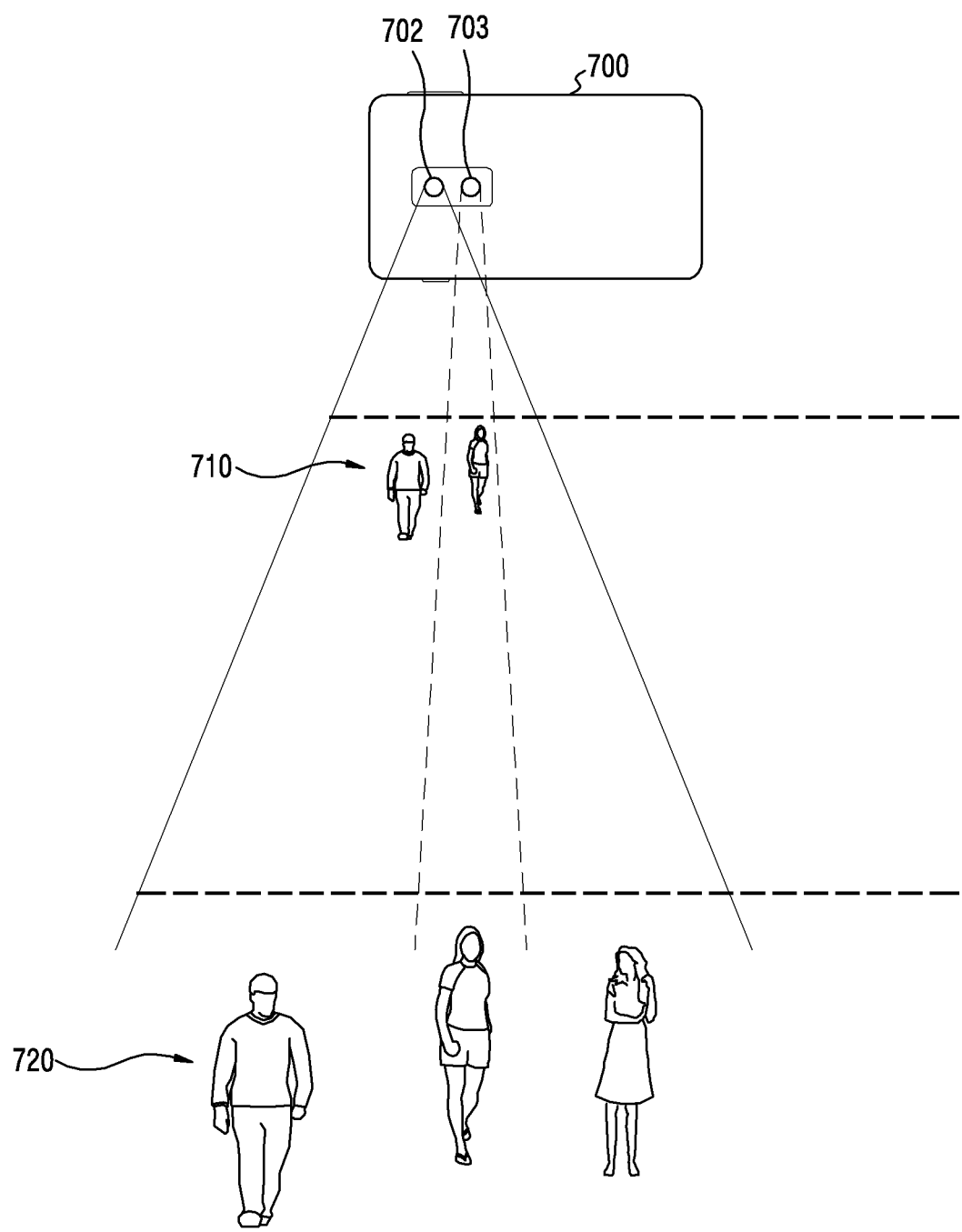
FIG. 7 is a diagram illustrating the configuration for controlling a multi-camera service on the basis of the distance to a subject by an electronic device according to various embodiments of the disclosure.

FIG. 6 is a flowchart illustrating a process of controlling a multi-camera service on the basis of the distance to a subject by an electronic device according to various embodiments of the disclosure. FIG. 7 is a diagram illustrating the configuration for controlling a multi-camera service on the basis of the distance to a subject by an electronic device according to various embodiments of the disclosure. Hereinafter, the operation of obtaining the second camera information from the image obtained via the first camera performed in operation 403 of FIG. 4 will be described in detail. Hereinafter, the electronic device may include the whole or a part (e.g., the processor 220) of the electronic device 201 illustrated in FIGS. 2A and 2B.

Referring to FIG. 6, when an image is obtained via the first camera (operation 401 of FIG. 4), the electronic device may detect the distance between the electronic device and an object on which focus is set in the image obtained via the first camera in operation 601. For example, the processor 220 may estimate the distance to the subject on which focus is set, on the basis of the focal distance of the first camera 282 for obtaining the image or depth information of an object included in the image. For example, the processor 220 may measure the distance to the object on which focus is set in the image using a separate distance measurement sensor, such as an ultrasonic sensor or the like.

In operation 603, the electronic device may determine whether the distance to the subject on which focus is set exceeds a reference distance. For example, the reference distance may be set on the basis of the minimum focal distance of the second camera 284.

When the distance to the subject on which focus is set exceeds the reference distance, the electronic device may obtain the second camera information from the image obtained via the first camera in operation 605. For example, when the distance between an electronic device 700 and a subject 720 on which focus is set in an image obtained via a first camera 702 exceeds a reference distance as shown in FIG. 7, the processor 220 may determine that the electronic device 700 is capable of capturing an image using a second camera 703. Accordingly, the processor 220 may detect an image attribute of a second camera area from a preview image obtained via the first camera 702, in order to determine whether to activate the second camera 703.

When the distance to the subject on which focus is set is less than or equal to the reference distance, the electronic device may deactivate the multi-camera mode in operation 607. For example, when the distance between the electronic device 700 and a subject 710 on which focus is set in the image obtained via the first camera 702 is less than or equal to the reference distance as shown in FIG. 7, the processor 220 may determine that the electronic device 700 is incapable of capturing an image using the second camera 703. Accordingly, the processor 220 may deactivate the multi-camera mode for driving the first camera 702 and the second camera 703. That is, the processor 220 may restrict driving of the second camera 703. Additionally or alternatively, when the distance to the subject 710 on which focus is set exceeds the reference distance as the electronic device 700 or the subject 710 moves, the processor 220 may activate the multi-camera mode. That is, the processor 220 may detect the image attribute of the second camera area from the preview image obtained via the first camera 702 in operation 605.

Figure 8:
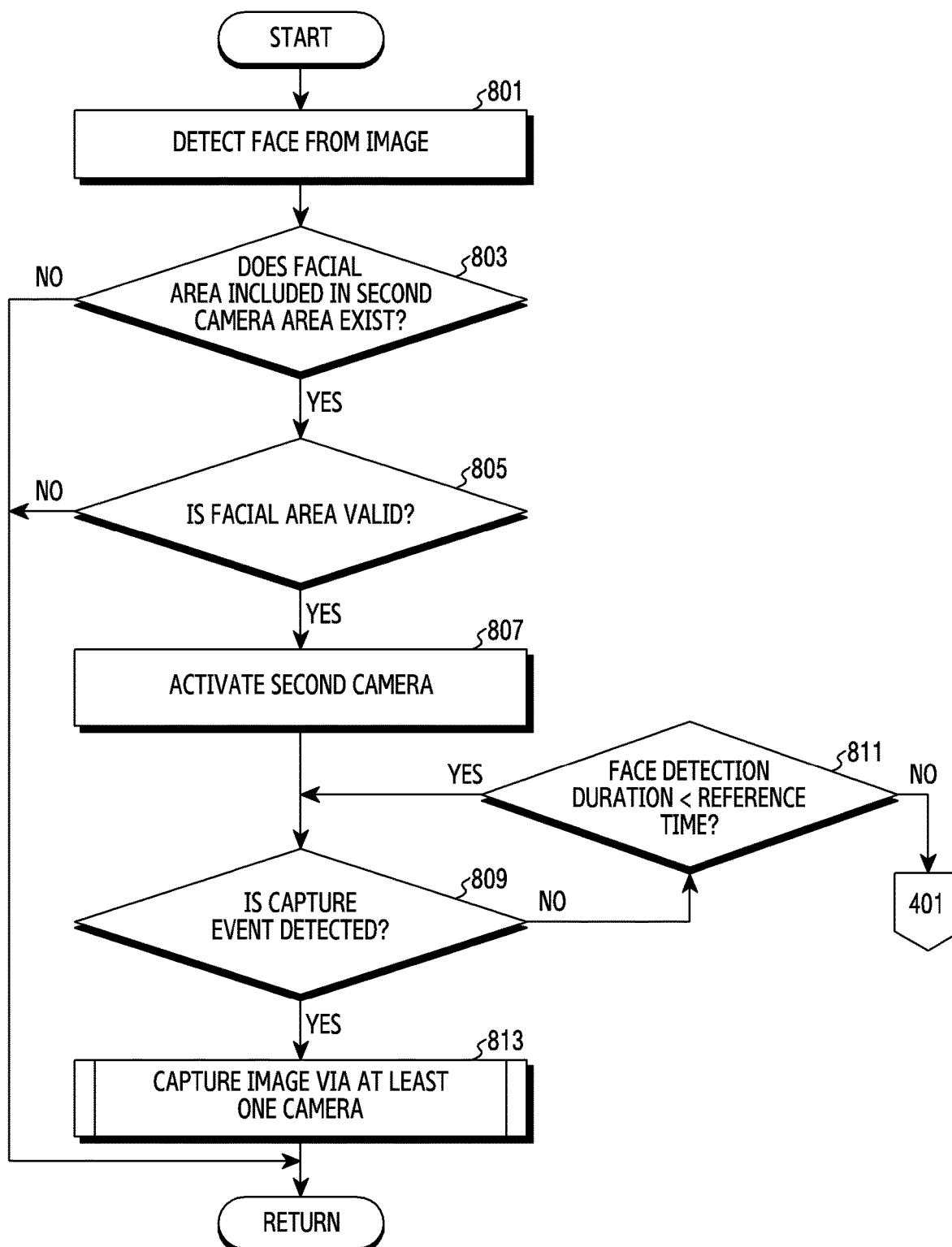
FIG. 8 is a flowchart illustrating a process of providing a multi-camera service on the basis of face detection information by an electronic device according to various embodiments of the disclosure.

FIG. 8 is a flowchart illustrating a process of providing a multi-camera service on the basis of face detection information by an electronic device according to various embodiments of the disclosure. FIGS. 9A to 9H are diagrams illustrating screen configurations for providing a multi-camera service on the basis of face detection information by an electronic device according to various embodiments of the disclosure. Hereinafter, the operation of activating the second camera performed in operations 403 and 405 of FIG. 4 will be described in detail. Hereinafter, the electronic device may include the whole or a part (e.g., the processor 220) of the electronic device 201 illustrated in FIGS. 2A and 2B.

Figure 9A:
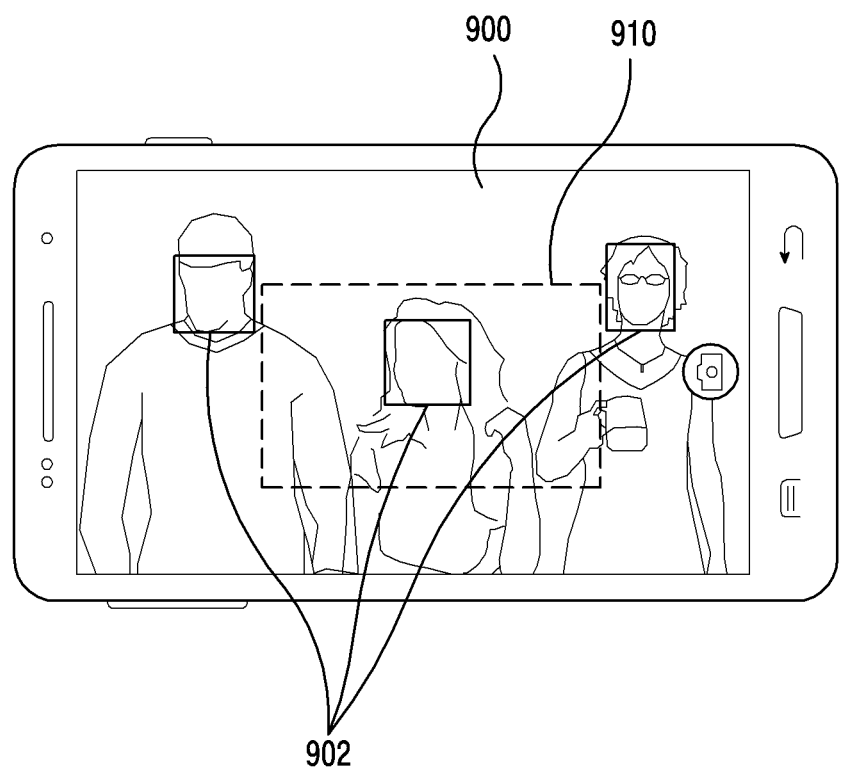
FIGS. 9A to 9H are diagrams illustrating screen configurations for providing a multi-camera service on the basis of face detection information by an electronic device according to various embodiments of the disclosure.

Referring to FIG. 8, when an image is obtained via the first camera (operation 401 of FIG. 4), the electronic device may detect the face of a subject from the image obtained via the first camera in operation 801. For example, the processor 220 may drive a face detection algorithm with respect to an image 900 obtained via the first camera 282, so as to detect a facial area 902 of a subject as illustrated in FIG. 9A.

Figure 9B:
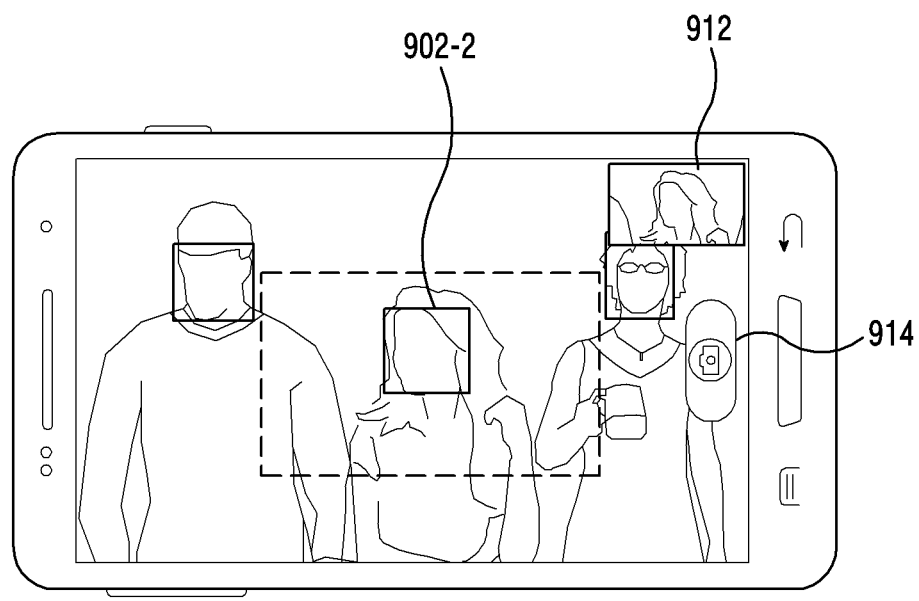
Figure 9C:
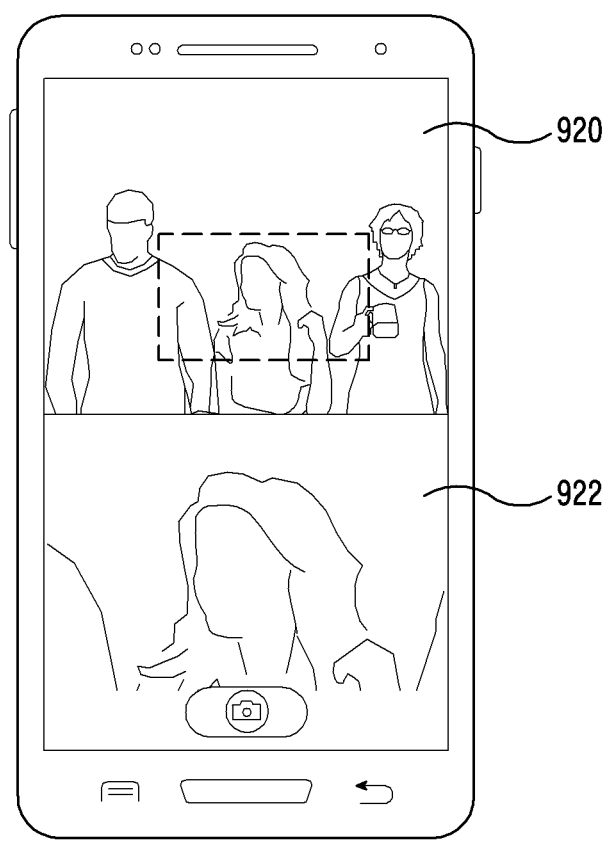
Figure 9D:
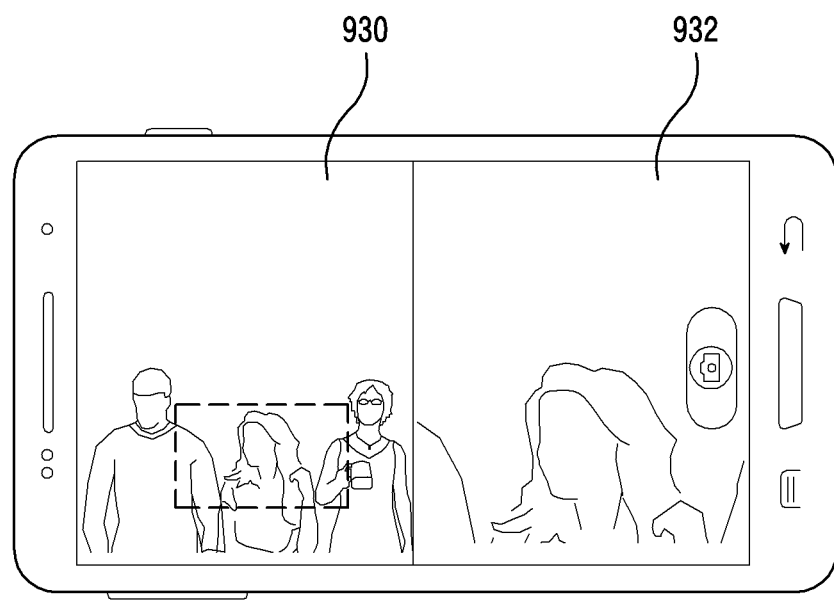

In operation 803, the electronic device may determine whether a facial area of the subject which is included in an area corresponding to the angle of view of a second camera exists in the image obtained via the first camera. For example, the processor 220 may determine whether a facial area 902-2 of the subject exists in a second camera area 910 of the image 900 obtained via the first camera 282, as illustrated in FIG. 9B.

Figure 9E:
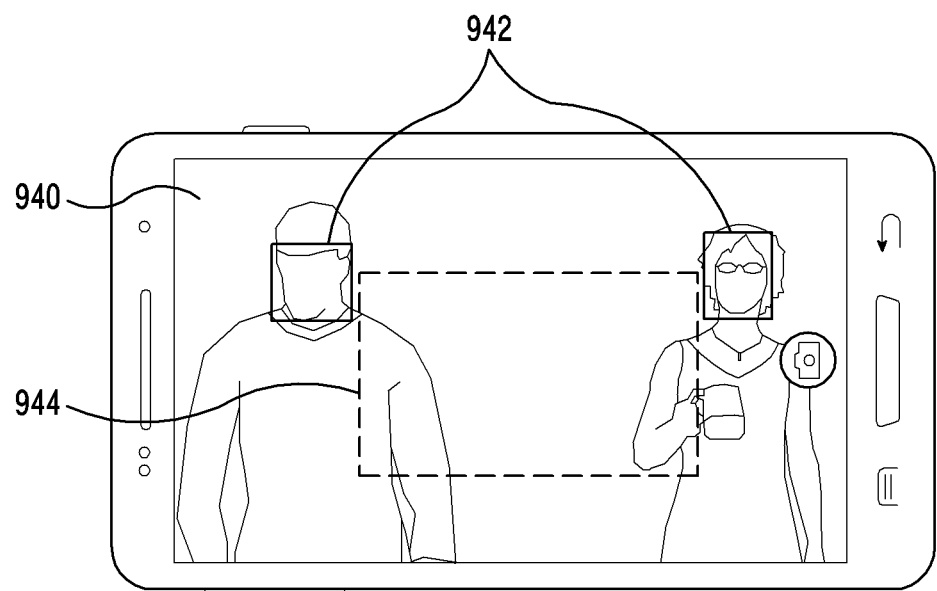

When the facial area of the subject included in the second camera area does not exist, the electronic device may determine not to activate the second camera. For example, when a facial area 942 detected from an image 940 obtained via the first camera 282 is not included in a second camera area 944 as illustrated in FIG. 9E, the processor 220 may determine that a subject captured by the second camera 284 does not exist. Accordingly, the processor 220 may restrict image capturing using the second camera 284. That is, the processor 220 may determine not to activate the second camera 284.

When the facial area of the subject which is included in the second camera area exists, the electronic device may determine whether the facial area of the subject included in the second camera area is valid in operation 805. For example, the processor 220 may determine the validity of the corresponding facial area on the basis of the size of the facial area of the subject included in the second camera area. For example, when the size of the facial area of the subject included in the second camera area is less than the minimum reference size, the processor 220 may determine that the corresponding facial area is invalid. When the size of the facial area of the subject included in the second camera area is greater than the maximum reference size, the processor 220 may determine that the corresponding facial area is invalid. For example, when only a part of the face of the subject is included in the second camera area, the processor 220 may determine that the corresponding facial area is invalid.

Figure 9F:
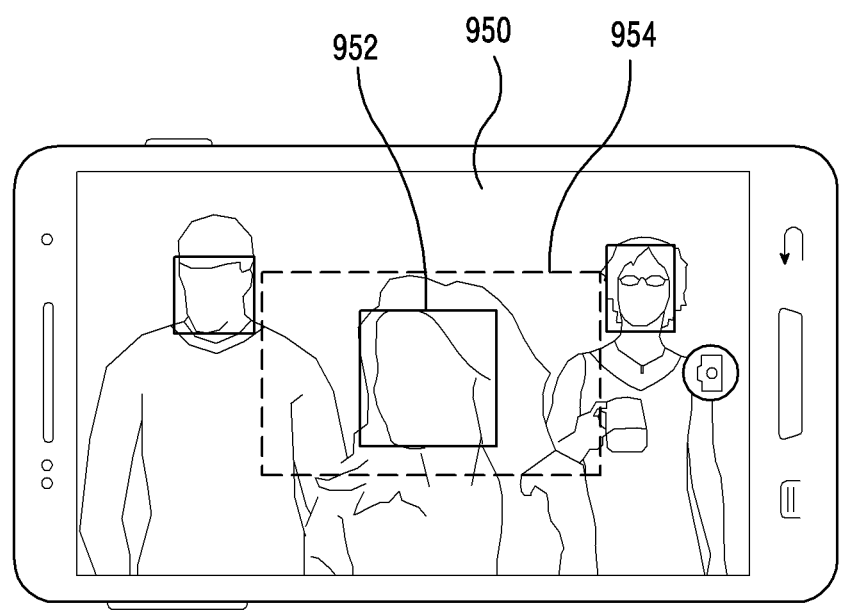
Figure 9G:
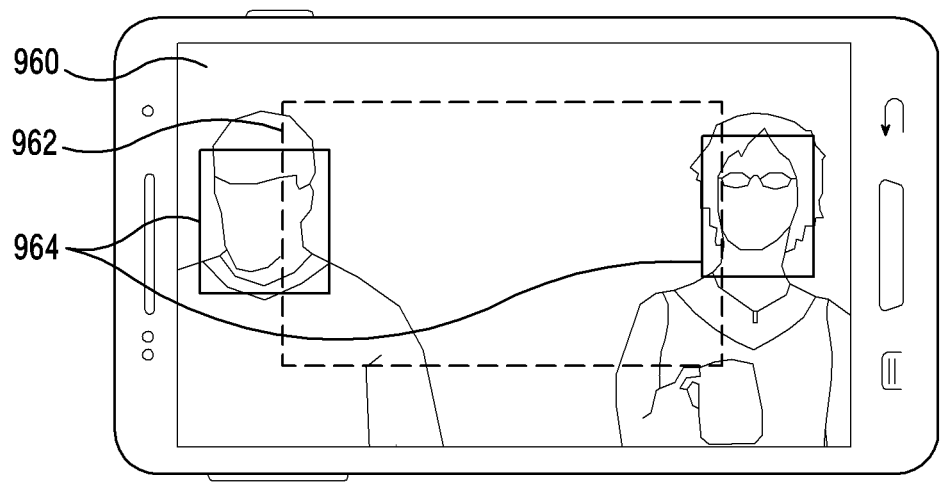

When the facial area of the subject included in the second camera area is invalid, the electronic device may determine not to activate the second camera. For example, when a facial area 952 of a subject included in a second camera area 954 of an image 950 obtained via the first camera 282 is greater than the maximum reference size as illustrated in FIG. 9F, the processor 220 may determine that the corresponding facial area is invalid. Accordingly, the processor 220 may determine not to activate the second camera 284. For example, when only a part 964 of the facial of a subject is included in a second camera area 962 of an image 960 obtained via the first camera 282, as illustrated in FIG. 9G, the processor 220 may determine that the corresponding facial area is invalid. Accordingly, the processor 220 may determine not to activate the second camera 284.

When the facial area of the subject included in the second camera area is valid, the electronic device may activate the second camera in operation 807. For example, when the facial area 902-2 of the subject which is valid is included in the second camera area 910 of the image 900 obtained via the first camera 282 as illustrated in FIG. 9B, the processor 220 may activate the second camera 284. Accordingly, the processor 220 may control the display 260 so as to display an object indicating the activated state of the first camera 282 and the second camera 284 in the multi-camera mode. For example, the object indicating the activated state of the first camera 282 and the second camera 284 may include a capture icon 914 which is modified for distinguishing a capture event using at least one of the first camera 282 and the second camera 284. For example, the object indicating the activated state of the first camera 282 and the second camera 284 may include a plurality of capture icons corresponding to different capture events. Additionally or alternatively, when the processor 220 activates the second camera 284, the processor 220 may control the display 260 so as to display an image 912 (e.g., a preview image) obtained via the second camera 284 in at least a part of the image 900 obtained via the first camera 282 as illustrated in FIG. 9B. For example, when the processor 220 activates the second camera 284, the processor 220 may control the display 260 so as to display an image 920 obtained via the first camera 282 and an image 922 obtained via the second camera 284 in different areas which are vertically divided. For example, when the processor 220 activates the second camera 284, the processor 220 may control the display 260 so as to display an image 930 obtained via the first camera 282 and an image 932 obtained via the second camera 284 in different areas which are horizontally divided. In this instance, the processor 220 may change a screen configuration of the image 930 obtained via the first camera 282 and the image 932 obtained via the second camera 284 which are displayed on the display 260. For example, the screen configuration may include at least one of the location, size, and ratio of a display area.

In operation 809, the electronic device determines whether the occurrence of a capture event is detected. For example, the processor 220 may determine whether a user input corresponding to the capture icon 914 is detected, as illustrated in FIG. 9B. For example, the processor 220 may determine whether a gesture input corresponding to a capture event is detected.

When a capture event does not occur, the electronic device may determine whether a face detection duration exceeds a reference time in operation 811. For example, the processor 220 may determine whether an available time for face detection performed in operation 801 expires.

When the face detection duration is less than the reference time, the electronic device may identify whether occurrence of a capture event is detected in operation 809.

When the face detection duration is greater than or equal to the reference time, the electronic device may determine that the available time for face detection expires. In this instance, the electronic device may obtain an image via the first camera in operation 401 of FIG. 4.

When it is detected that a capture event occurs, the electronic device captures an image using at least one camera on the basis of the capture event in operation 813. For example, the processor 220 may capture an image using at least one of the first camera 282 and the second camera 284 on the basis of a capture event type. For example, the types of capture events may be classified on the basis of at least one of a gesture for capture, the strength of pressure, a touch duration, the number of touches, and a capture icon type, and the like.

According to various embodiments of the disclosure, the electronic device may determine whether the face of the subject is detected from an area corresponding to the angle of view of the second camera in the image obtained via the first camera. For example, the processor 220 may apply a face detection algorithm to the entirety of the image obtained via the first camera 282 or to at least a part corresponding to the second camera area, so as to detect a facial area included in the second camera area.

Figure 9H:
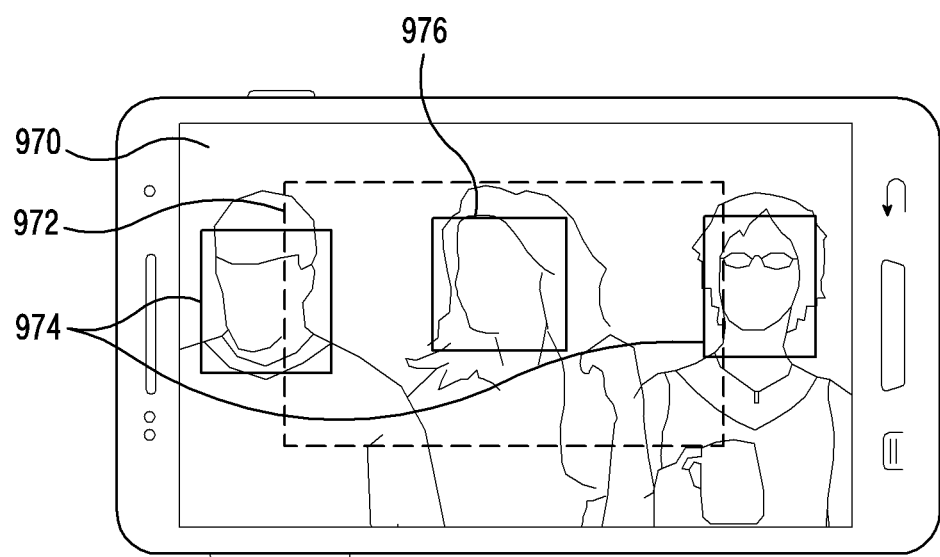

According to various embodiments of the disclosure, when a plurality of facial areas are detected from the second camera area, the electronic device may determine whether each of the facial areas is valid. When at least one facial area is valid from among the plurality of facial areas, the electronic device may determine that the electronic device is capable of capturing an image using the second camera. Accordingly, the electronic device may activate the second camera. For example, when a part 974 of the face of a first subject and the entire area 976 of the face of a second subject are included in a second camera area 972 of an image 970 obtained via the first camera 282 as illustrated in FIG. 9H, the processor 220 may determine that the facial area of the subject included in the second camera area 972 is valid. Accordingly, the processor 220 may activate the second camera 284.

Figure 10:
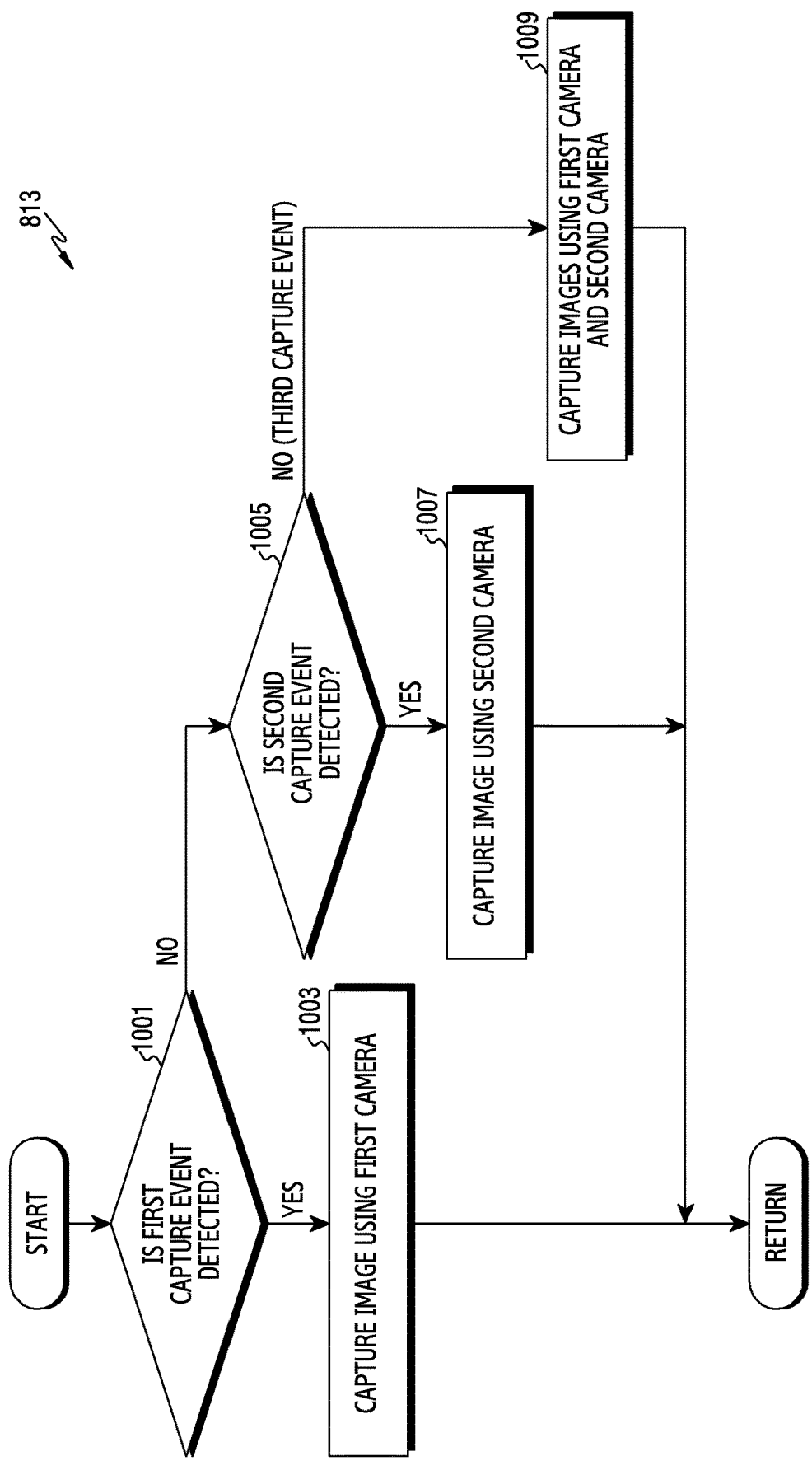
FIG. 10 is a flowchart illustrating a process of capturing an image by an electronic device according to various embodiments of the disclosure.

FIG. 10 is a flowchart illustrating a process of capturing an image by an electronic device according to various embodiments of the disclosure. FIGS. 11A to 11F are diagrams illustrating images captured by an electronic device according to various embodiments of the disclosure. Hereinafter, the operation of capturing the image executed in operation 813 of FIG. 8 will be described. Hereinafter, the electronic device may include the whole or a part (e.g., the processor 220) of the electronic device 201 illustrated in FIGS. 2A and 2B.

Figure 11A:
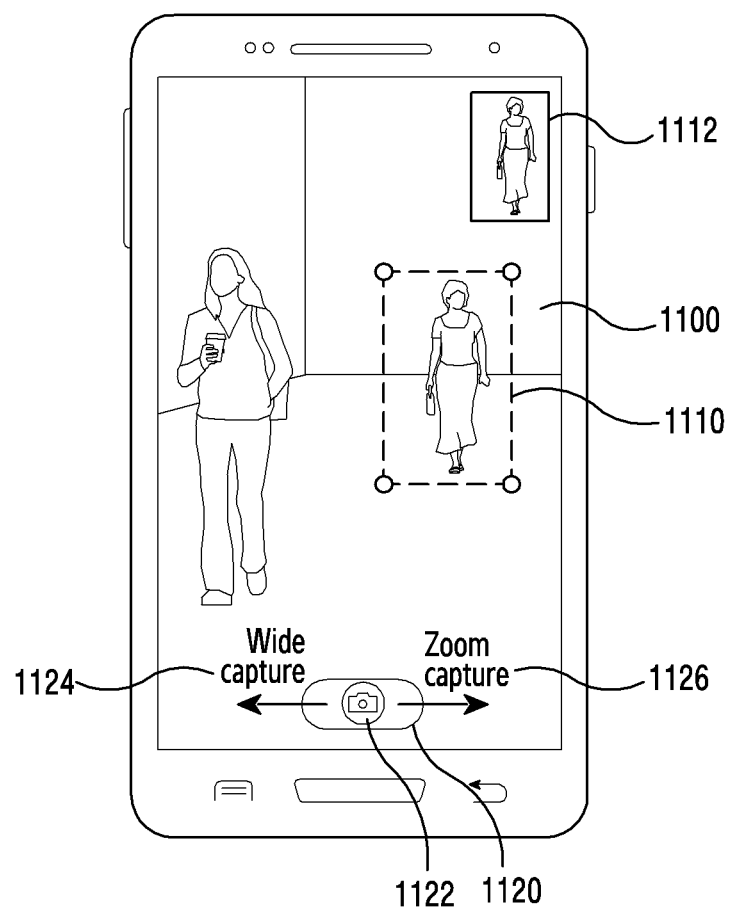
FIGS. 11A to 11F are diagrams illustrating images captured by an electronic device according to various embodiments of the disclosure.

Referring to FIG. 10, when a capture event occurs in the state in which the first camera and the second camera are activated (e.g., operation 809 of FIG. 8), the electronic device may determine whether occurrence of a first capture event is detected in operation 1001. For example, when the first camera 282 and the second camera 284 are activated, the processor 220 may control the display 260 so as to display an object corresponding to the activated state of the first camera 282 and the second camera 284 as illustrated in FIG. 11A. For example, the object corresponding to the activated state may include a capture icon 1120 modified to distinguish a capture event using at least one camera 282 and 284. The capture icon 1120 may include a user select area 1122 for a capture event and guide information 1124 and 1126 for distinguishing a capture event. The processor 220 may determine whether a first capture event is detected on the basis of the type of an input of the capture icon 1120. Additionally or alternatively, when the first camera 282 and the second camera 284 are activated, the processor 220 may control the display 260 so as to display an image 1112 obtained via the second camera 284 to overlap at least a part of an image 1100 obtained via the first camera 282 as illustrated in FIG. 11A. In this instance, the image 1112 obtained via the second camera 284 may correspond to a second camera area 1110 of the image 1100 obtained via the first camera 282.

Figure 11B:
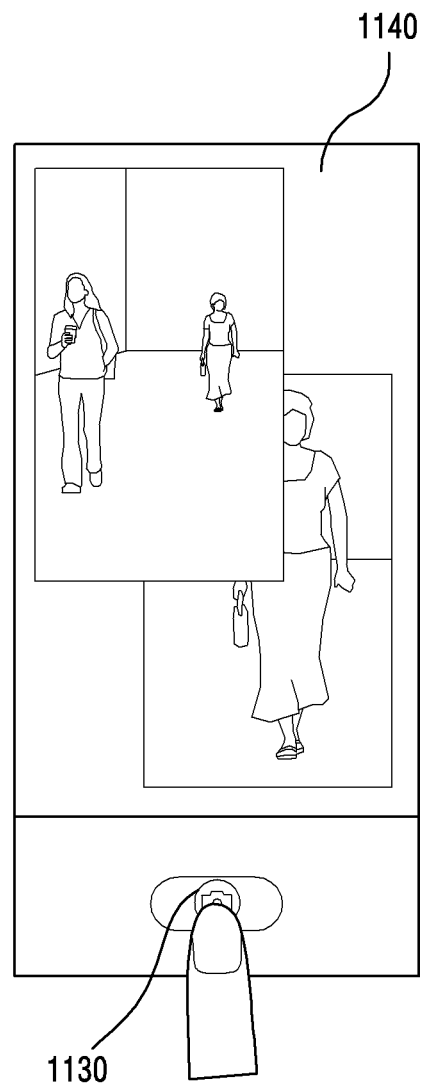
Figure 11C:
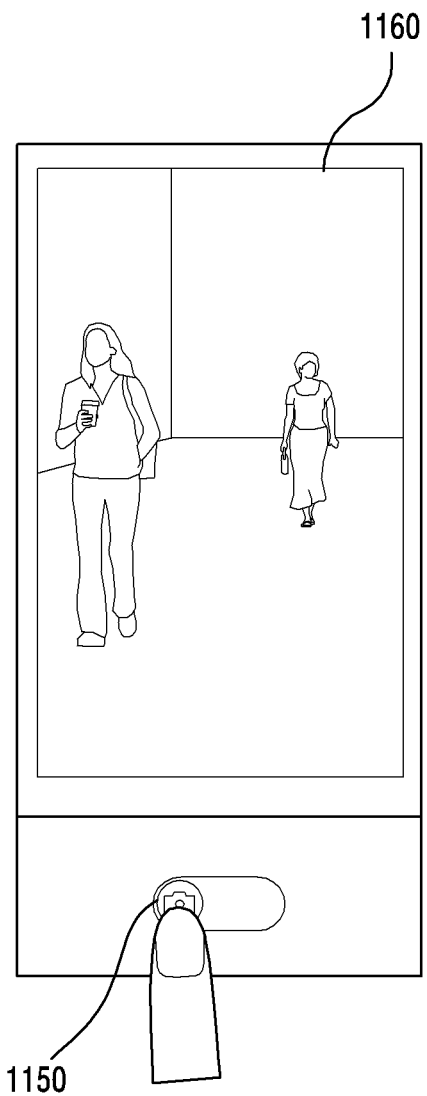

In operation 1003, the electronic device may capture an image via the first camera when it is detected that a first capture event occurs. For example, when a drag input 1150 provided to the left of the user select area 1122 of the capture icon 1120 is detected as illustrated in FIG. 11C, the processor 220 may determine that the first capture event occurs. Accordingly, the processor 220 may capture an image 1160 via the first camera 282.

In operation 1005, when the first capture event does not occur, the electronic device may determine whether occurrence of a second capture event occurs in operation 1005.

Figure 11D:
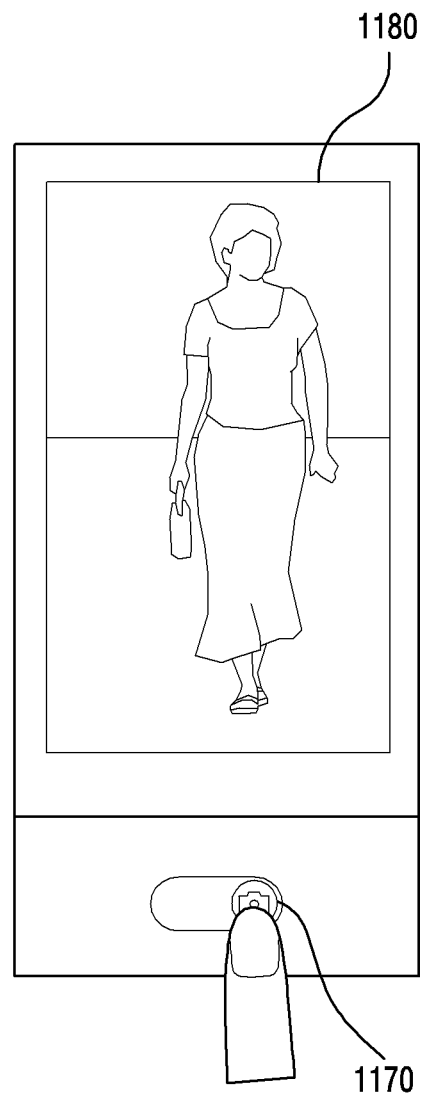

In operation 1007, the electronic device may capture an image via the second camera when it is detected that the second capture event occurs. For example, when a drag input 1170 provided to the right of the user select area 1122 of the capture icon 1120 is detected as illustrated in FIG. 11D, the processor 220 may determine that the second capture event occurs. Accordingly, the processor 220 may capture an image 1180 via the second camera 284.

When the first capture event and the second capture event do not occur, the electronic device may determine that a third capture event occurs in operation 1009. Accordingly, the electronic device may capture images via the first camera and the second camera. For example, when a touch input 1130 to the user select area 1122 of the capture icon 1120 is detected as illustrated in FIG. 11B, the processor 220 may determine that the third capture event occurs. Accordingly, the processor 220 may capture images 1140 via the first camera 282 and the second camera 284.

According to an embodiment, when the images 1140 are captured via the first camera 282 and the second camera 284, the electronic device may combine the images captured via the first camera 282 and the second camera 284 to form a single image and may store the single combined image.

According to an embodiment, when the images 1140 are captured via the first camera 282 and the second camera 284, the electronic device may separately store the images captured respectively by the first camera 282 and the second camera 284.

Figure 11E:
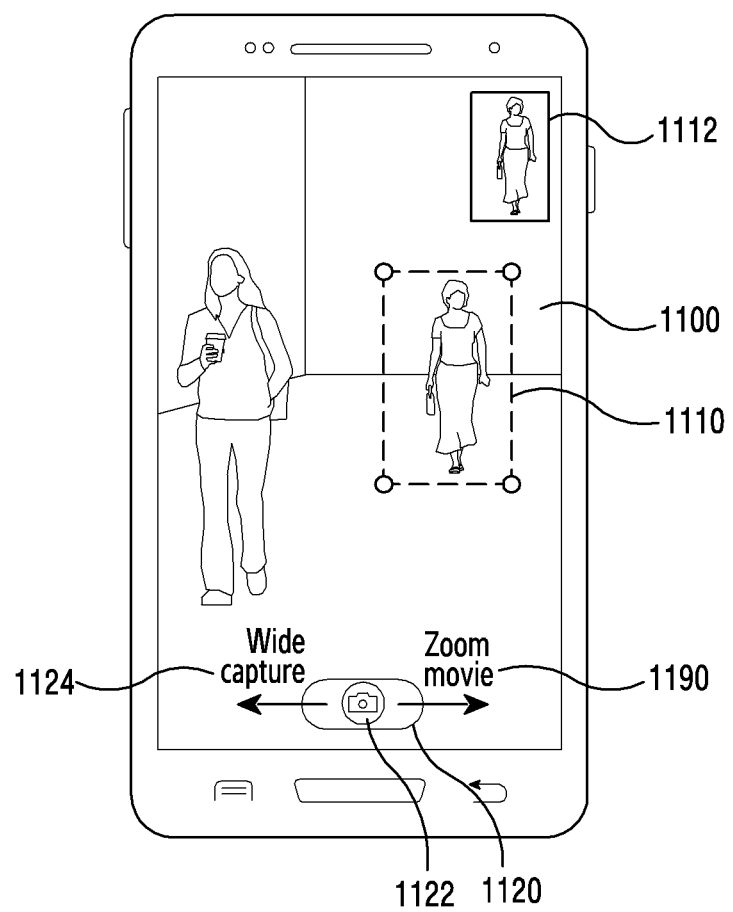
Figure 11F:
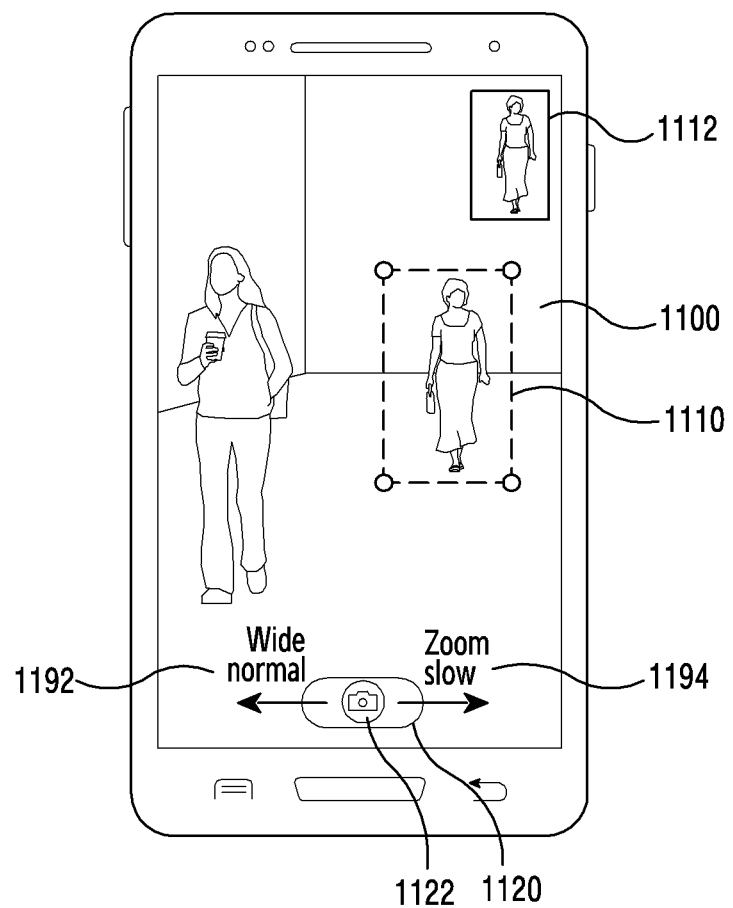

According to various embodiments of the disclosure the electronic device may change a capture event type using the capture icon 1122 on the basis of the result of analyzing the image obtained by a camera or a user input. For example, the processor 220 may change a capture event type matched to the capture icon 1122, on the basis of the movement of a subject or a user input to an area corresponding to the guide information 1124 and 1126. For example, when the movement of the subject included in the second camera area 1110 is detected, the processor 220 may identify the magnitude of the movement of the subject. When the magnitude of the movement of the subject included in the second camera area 1110 is less than a reference magnitude, the processor 220 may change the capture event of the second camera 284 to video shooting 1190, as illustrated in FIG. 11E. In this instance, the processor 220 may maintain the capture event of the first camera 282 as image capturing 1124. Additionally or alternatively, when the magnitude of the movement of the subject included in the second camera area 1110 exceeds the reference magnitude, the processor 220 may change the capture event of the second camera 284 to slow video shooting 1194, as illustrated in FIG. 11E. In this instance, the processor 220 may change the capture event of the first camera 282 to normal video shooting 1192. For example, when a user input to an area corresponding to the guide information 1126 of the second camera 284 is detected, the processor 220 may change the capture event of the second camera 284 in order of image capturing, video shooting, slow video shooting, and fast video shooting, on the basis of a user input.

Figure 12:
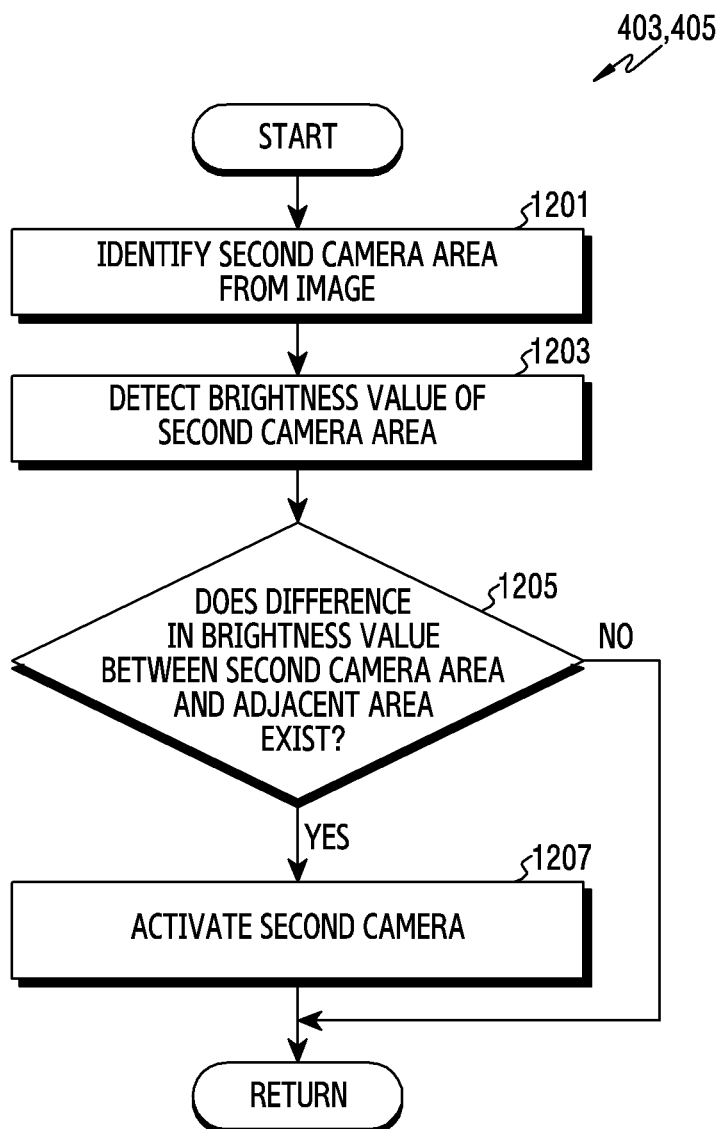
FIG. 12 is a flowchart illustrating a process of providing a multi-camera service on the basis of the brightness value of an image by an electronic device according to various embodiments of the disclosure.
Figure 13A:
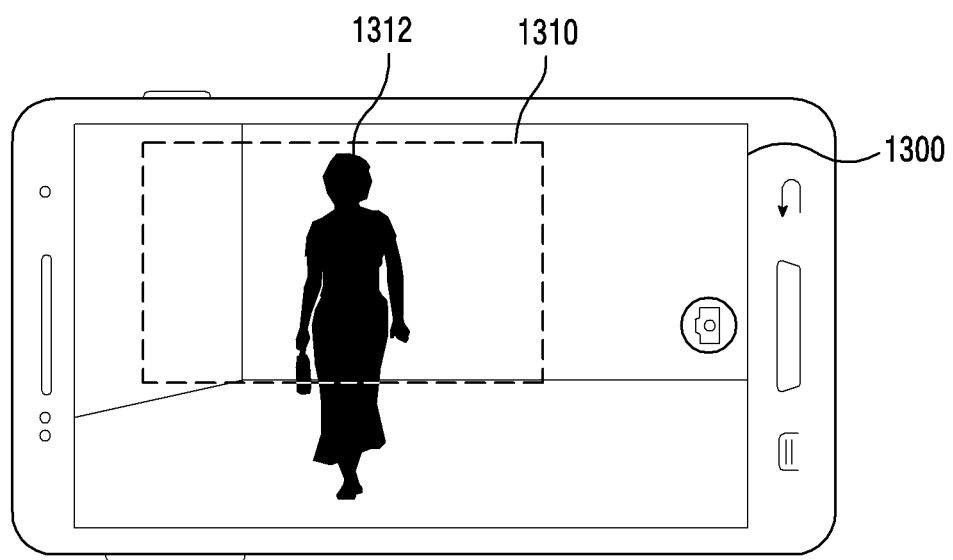
FIGS. 13A and 13B are diagrams illustrating screen configurations for providing a multi-camera service on the basis of backlight information of a subject by an electronic device according to various embodiments of the disclosure.
Figure 13B:
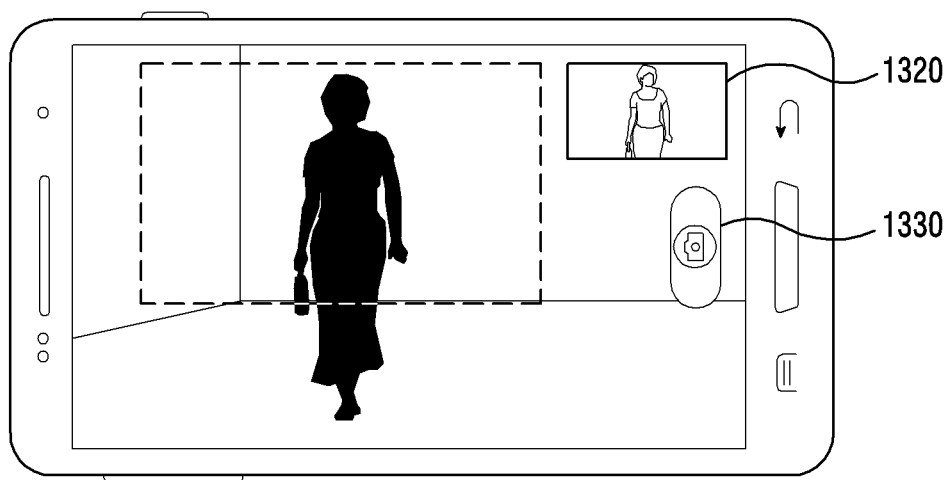
Figure 14A:
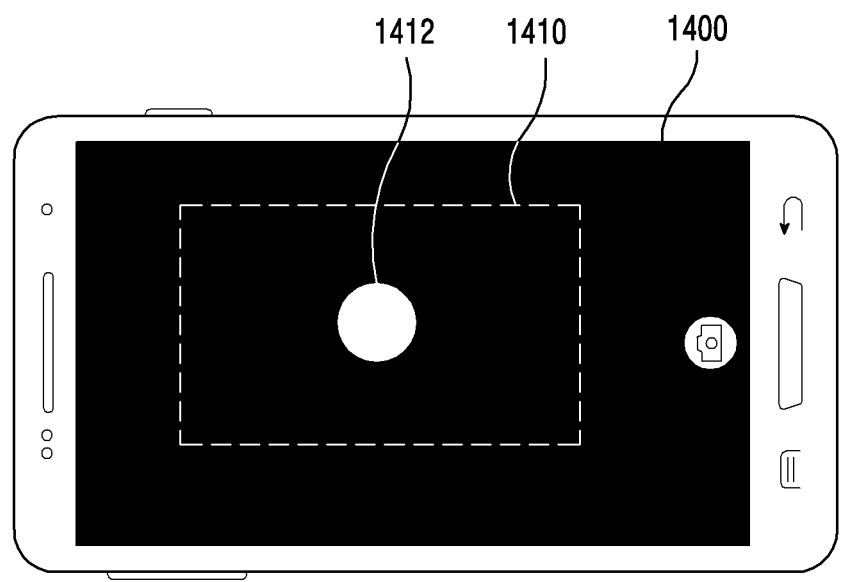
FIGS. 14A and 14B are diagrams illustrating screen configurations for providing a multi-camera service on the basis of the difference in brightness value in an image by an electronic device according to various embodiments of the disclosure.
Figure 14B:
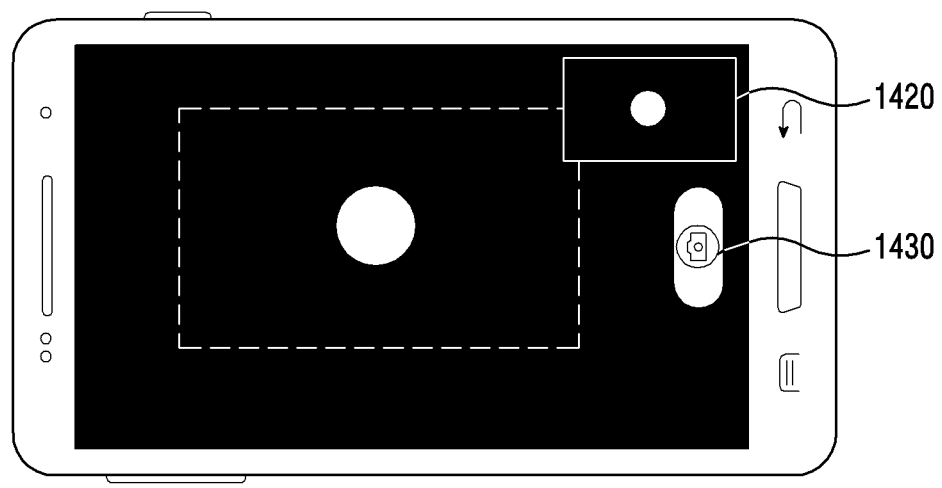

FIG. 12 is a flowchart illustrating a process of providing a multi-camera service on the basis of the brightness value of an image by an electronic device according to various embodiments of the disclosure. FIGS. 13A and 13B are diagrams illustrating screen configurations for providing a multi-camera service on the basis of backlight information of a subject by an electronic device according to various embodiments of the disclosure. FIGS. 14A and 14B are diagrams illustrating screen configurations for providing a multi-camera service on the basis of the difference in brightness value in an image by an electronic device according to various embodiments of the disclosure. Hereinafter, the operation of activating the second camera performed in operations 403 and 405 of FIG. 4 will be described in detail. Hereinafter, the electronic device may include the whole or a part (e.g., the processor 220) of the electronic device 201 illustrated in FIGS. 2A and 2B.

Referring to FIG. 12, when an image is obtained via the first camera (operation 401 of FIG. 4), the electronic device may determine a second camera area from the image obtained via the first camera in operation 1201. For example, when an image 1300 is obtained via the first camera 282 as illustrated in FIG. 13A, the processor 220 may identify a second camera area 1310 from the corresponding image 1300. For example, when an image 1400 is obtained via the first camera 282 as illustrated in FIG. 14A, the processor 220 may identify a second camera area 1410 from the corresponding image 1400.

In operation 1203, the electronic device may detect the brightness value of the second camera area from the image obtained via the first camera. For example, the processor 220 may divide the image obtained via the first camera 282 into a plurality of areas, and may detect the brightness value of each area. The processor 220 may determine the brightness value of at least one area corresponding to the second camera area from among the plurality of areas, to be the brightness value of the second camera area.

In operation 1205, the electronic device may determine whether the difference in brightness value exists between the second camera area and the remaining area in the image obtained via the first camera. For example, the processor 220 may determine whether the difference in brightness value between the second camera area and the remaining area of the image obtained via the first camera 282 exceeds a reference value.

In operation 1207, when the difference in brightness value exists between the second camera area and the remaining area in the image obtained via the first camera, the electronic device may determine that image capturing using the second camera is valid. Accordingly, the electronic device may change the second camera currently operating in an idle mode into an activation mode For example, when an object 1312 is backlit, which is included in the second camera area 1310 in the image 1300 obtained via the first camera 282, as illustrated in FIG. 13A, the brightness value of the second camera area 1310 may be lower than the brightness value of the remaining area due to the backlight on the object 1312. In this instance, the processor 220 may control the second camera 284 to change to the activation mode. When the second camera 284 is activated, the processor 220 may change a capture icon 1330 in order to perform capturing in the multi-camera mode, as illustrated in FIG. 13B. Additionally or alternatively, when the second camera 284 is activated, the processor 220 may control the display 260 so as to display an image 1320 obtained via the second camera 284 to be distinguished from the image 1300 obtained via the first camera 282. For example, when a bright object 1412 exists in a second camera area 1410 in the image 1400 obtained via the first camera 282, as illustrated in FIG. 14A, the brightness value of the second camera area 1410 may be higher than the brightness value of the remaining area due to the brightness value of the object 1412. In this instance, the processor 220 may control the second camera 284 to change to the activation mode. When the second camera 284 is activated, the processor 220 may change a capture icon 1430 in order to perform capturing in the multi-camera mode, as illustrated in FIG. 14B. Additionally or alternatively, when the second camera 284 is activated, the processor 220 may control the display 260 so as to display an image 1420 obtained via the second camera 284 to be distinguished from the image 1400 obtained via the first camera 282.

According to an embodiment, when an object exists in an area which corresponds to the angle of view of the second camera and has a brightness value lower than a reference value in the image obtained via the first camera, the electronic device may activate the second camera in order to identify the state of an image obtained by the second camera. For example, when a subject included in the second camera area is backlit, the processor 220 may change the second camera 284 to the activation mode.

Figure 15:
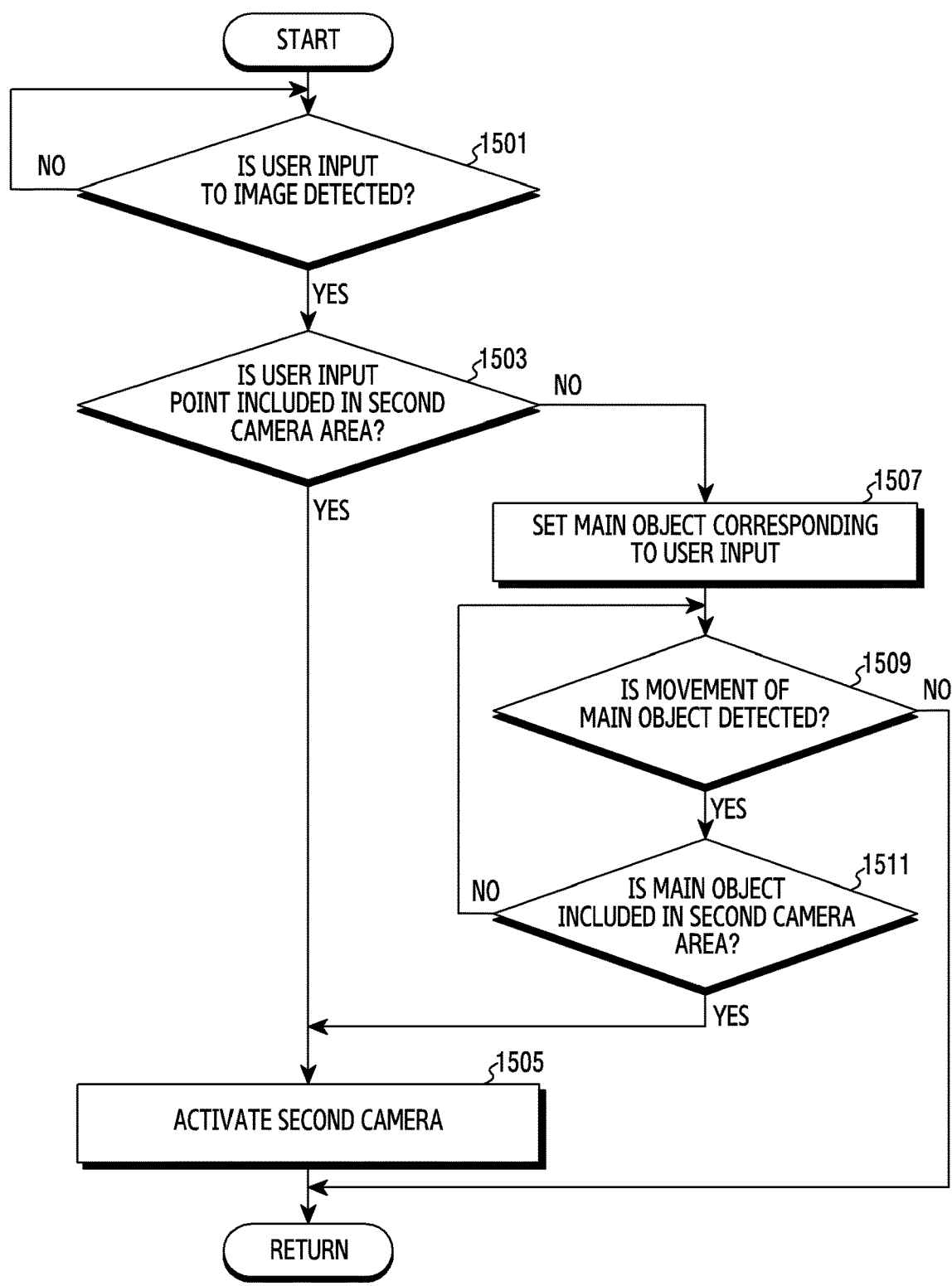
FIG. 15 is a flowchart illustrating a process of providing a multi-camera service on the basis of the location of an object by an electronic device according to various embodiments of the disclosure.
Figure 16A:
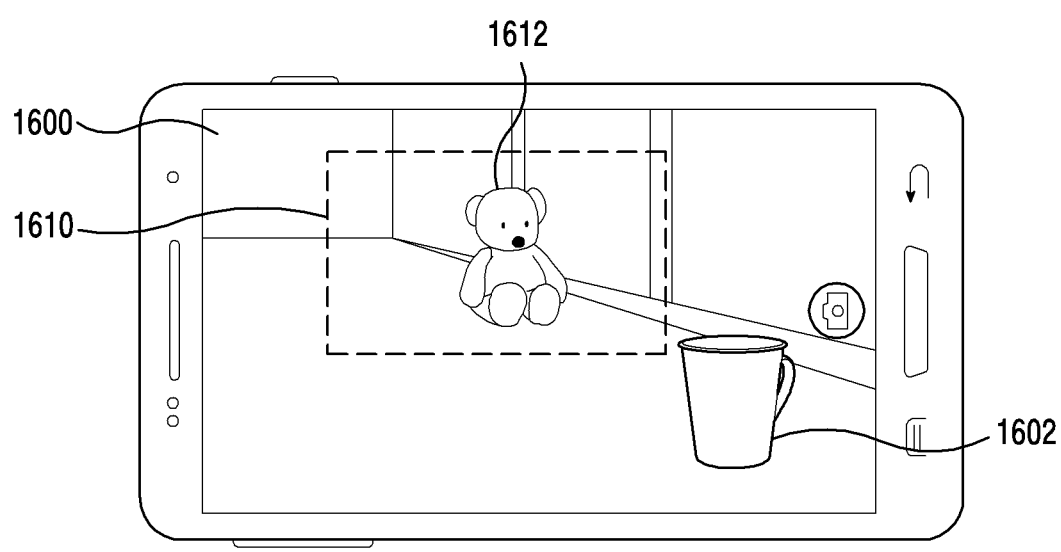
FIGS. 16A and 16B are diagrams illustrating screen configurations for providing a multi-camera service on the basis of focus setting information associated with a second camera area according to various embodiments of the disclosure.
Figure 16B:
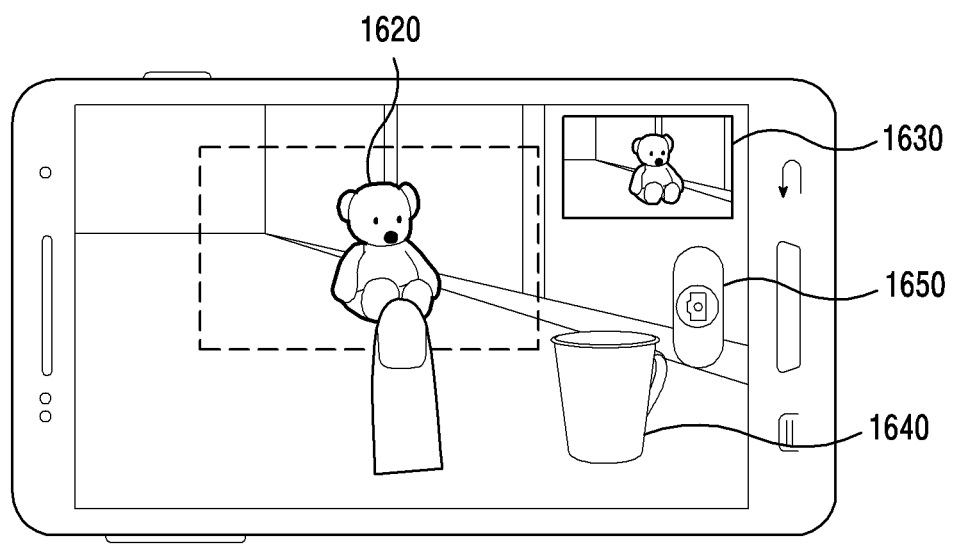
Figure 17A:
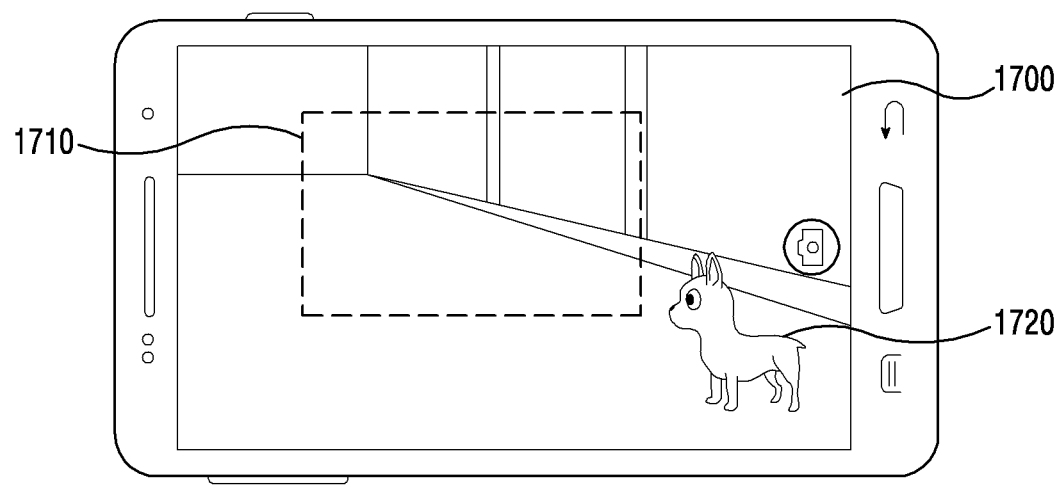
FIGS. 17A and 17B are diagrams illustrating screen configurations for providing a multi-camera service on the basis of movement information of an object on which focus is set according to various embodiments of the disclosure.
Figure 17B:
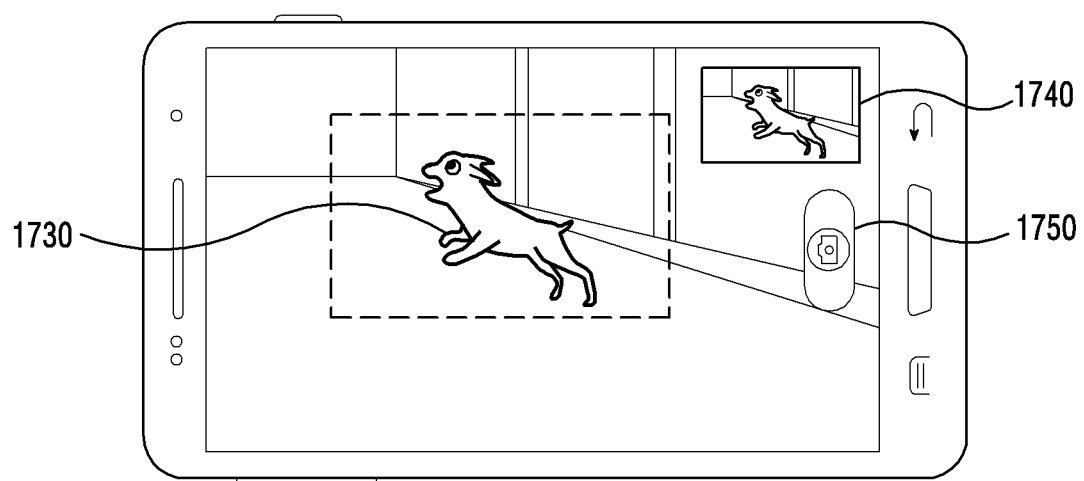

FIG. 15 is a flowchart illustrating a process of providing a multi-camera service on the basis of the location of an object by an electronic device according to various embodiments of the disclosure. FIGS. 16A and 16B are diagrams illustrating screen configurations for providing a multi-camera service on the basis of focus setting information associated with a second camera area according to various embodiments of the disclosure. FIGS. 17A and 17B are diagrams illustrating screen configurations for providing a multi-camera service on the basis of movement information of an object on which focus is set according to various embodiments of the disclosure. Hereinafter, the operation of activating the second camera performed in operations 403 and 405 of FIG. 4 will be described in detail. Hereinafter, the electronic device may include the whole or a part (e.g., the processor 220) of the electronic device 201 illustrated in FIGS. 2A and 2B.

Referring to FIG. 15, when an image is obtained via the first camera (operation 401 of FIG. 4), the electronic device may determine whether a user input to the image obtained via the first camera is detected in operation 1501. For example, when the second camera 284 operates in an idle mode in the state in which the multi-camera mode is set, the processor 220 may perform control so as to display, on the display 260, a preview image 1600 obtained via the first camera 282. In this instance, focus may be set on a first object 1602 among the first object 1602 and a second object 1612 included in the preview image 1600. The processor 220 may identify whether a touch input (e.g., a tap input) to the preview image which is obtained via the first camera 282 and is displayed on the display 260.

When a user input to the image obtained via the first camera is detected, the electronic device may determine whether a point at which the user input is provided is included in a second camera area in operation 1503. For example, the processor 220 may identify whether a point corresponding to a touch input (e.g., a tap input) provided to the preview image, which is obtained via the first camera 282 and is displayed on the display 260, is included in the second camera area.

When the user input point is included in the second camera area, the electronic device may activate the second camera in operation 1505. For example, when a user input point 1620 is included in a second camera area 1610 as illustrated in FIG. 16B, the processor 220 may determine that focus is set on the object 1612 corresponding to the user input point 1620 in the second camera area 1610. That is, the processor 220 may recognize the object 1612 corresponding to the user input point 1620 in the second camera area 1610, as a main object for shooting. Accordingly, the processor 220 may determine that image capturing using the second camera 284 is valid, and may perform control so as to change the second camera 284 currently operating in the idle mode into the activation mode. When the second camera 284 is activated, the processor 220 may change a capture icon 1650 so as to correspond to the multi-camera mode. Additionally or alternatively, when the first camera 282 and the second camera 284 are activated, the processor 220 may control the display 260 so as to display an image 1630 obtained via the second camera 284 to be distinguished from the image obtained via the first camera 282. For example, the processor 220 may control the display 260 so as to display the image 1630 obtained via the second camera 284 to overlap at least a part of the image obtained via the first camera 282.

When the user input point is not included in the second camera area, the electronic device may set an object corresponding to a user input as a main object for shooting in operation 1507. For example, when a user input to an image 1700 obtained via the first camera 282 is detected, the processor 220 may set focus of the first camera 282 on an object 1720 corresponding to the user input point as illustrated in FIG. 17A.

The electronic device may determine whether movement of the main object is detected in operation 1509. For example, the processor 220 may compare preview images periodically obtained via the first camera 282 so as to determine whether the location of the main object 1720 is changed. When the location of the main object 1720 is changed, the processor 220 may determine that movement of the main object 1720 is detected.

When the movement of the main object is detected, the electronic device may determine whether the main object enters the second camera area in operation 1511. For example, the processor 220 may determine whether the main object 1720 is located in a second camera area 1710 as illustrated in FIG. 17B.

When the main object is included in the second camera area, the electronic device may activate the second camera in operation 1505. For example, when the main object 1720 on which focus is set moves to the second camera area 1710 as illustrated in FIG. 17B, the processor 220 may determine that image capturing of the main object using the second camera 284 is valid. Accordingly, the processor 220 may perform control so as to change the second camera 284 currently operating in the idle mode to the activation mode. When the second camera 284 is activated, the processor 220 may change a capture icon 1750 so as to correspond to the multi-camera mode. That is, the processor 220 may modify a capture icon 1750 so as to indicate the activated state of the first camera 282 and the second camera 284. Additionally or alternatively, when the first camera 282 and the second camera 284 are activated, the processor 220 may control the display 260 so as to display an image 1740 obtained via the second camera 284 to overlap at least a part of the image obtained via the first camera 282.

Figure 18:
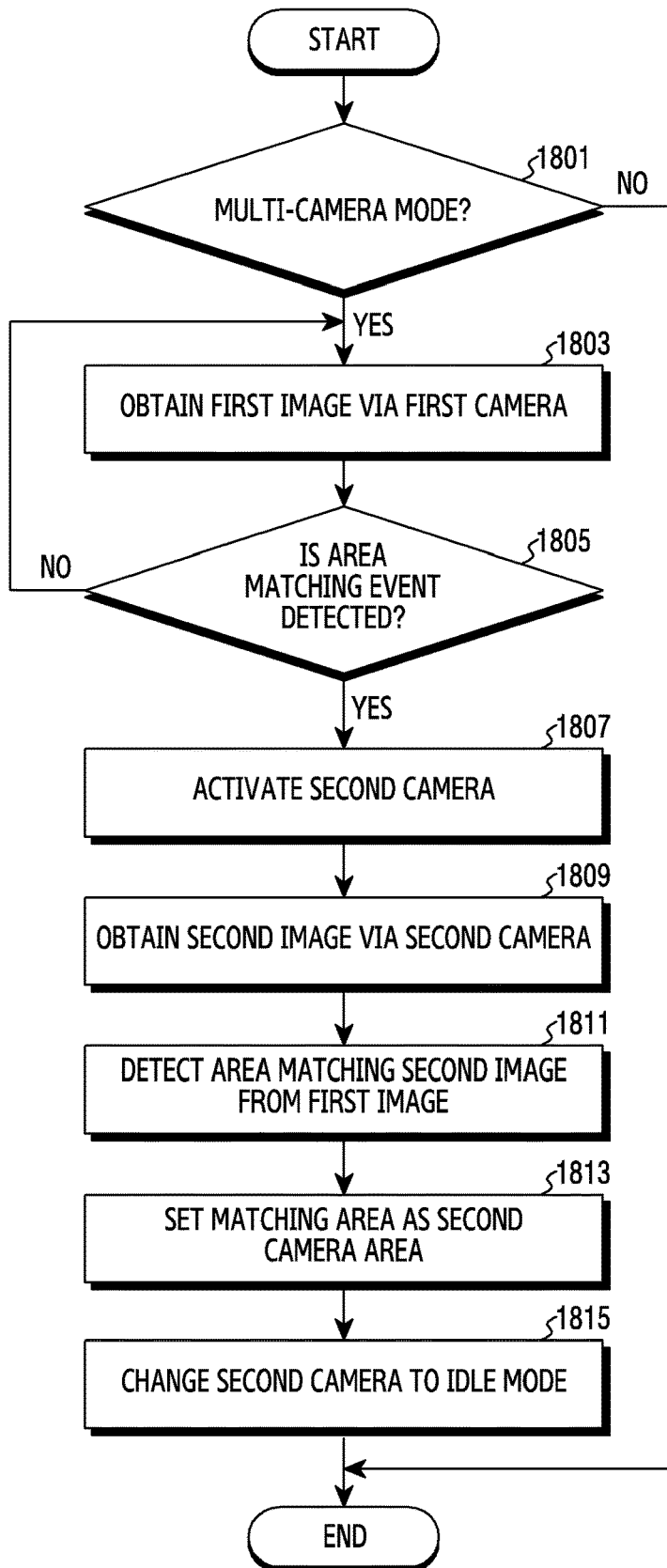
FIG. 18 is a flowchart illustrating a process by which an electronic device sets a second camera area in an image obtained via a first camera according to various embodiment of the disclosure.

FIG. 18 is a flowchart illustrating a process by which an electronic device sets a second camera area in an image obtained via a first camera according to various embodiment of the disclosure. Hereinafter, the electronic device may include the whole or a part (e.g., the processor 220) of the electronic device 201 illustrated in FIGS. 2A and 2B.

Referring to FIG. 18, the electronic device may determine whether a multi-camera mode is set in operation 1801. For example, the processor 220 may determine whether a user input for setting the multi-camera mode is detected via the input/output interface 250.

When the multi-camera mode is set, the electronic device may obtain a first image via a first camera in operation 1803. For example, when the multi-camera mode is set, the processor 220 may perform initial setting for activating the first camera 282 and may activate an image sensor of the first camera 282. The processor 220 may control the display 260 so as to display a preview image obtained via the first camera 282. In this instance, the processor 220 may perform initial setting for activating the second camera 284, and may perform control such that the second camera 284 operates in the idle mode that deactivates an image sensor of the second camera 284.

In operation 1805, the electronic device determines whether the occurrence of an area matching event is detected. For example, the processor 220 may determine whether a period arrives, which is for setting the location of a second camera area in the image obtained via the first camera 282.

When the area matching event does not occur, the electronic device may obtain a first image via the first camera in operation 1803. For example, the processor 220 may determine whether to activate a second camera on the basis of an image attribute of a second camera area of the first image, like operations 401 to 405 of FIG. 4.

When it is detected that the area matching event occurs, the electronic device may activate the second camera to match the location of the second camera area of the first image obtained via the first camera in operation 1807.

In operation 1809, the electronic device may obtain a second image via the second camera. For example, the processor 220 may identify a second image corresponding to the angle of view of the second camera area via the second camera 284.

In operation 1811, the electronic device may detect an area that matches the second image, from the first image. For example, the processor 220 may sequentially move the second image on the basis of the second camera area of the first image, so as to detect the area that matches the second image.

In operation 1813, the electronic device may set the area that matches the second image, as the second camera area in the first image.

When the second camera area of the first image is set, the electronic device may change the second camera to an idle mode in operation 1815. For example, the processor 220 may deactivate the image sensor of the second camera 284 in the state of maintaining the initial setting of the second camera 284.

According to an embodiment, when it is detected that the area matching event occurs in the state in which the first camera and the second camera are activated, the electronic device may compare the image of the first camera and the image of the second camera so as to set the location of the second camera area in operations 1811 to 1813.

Figure 19:
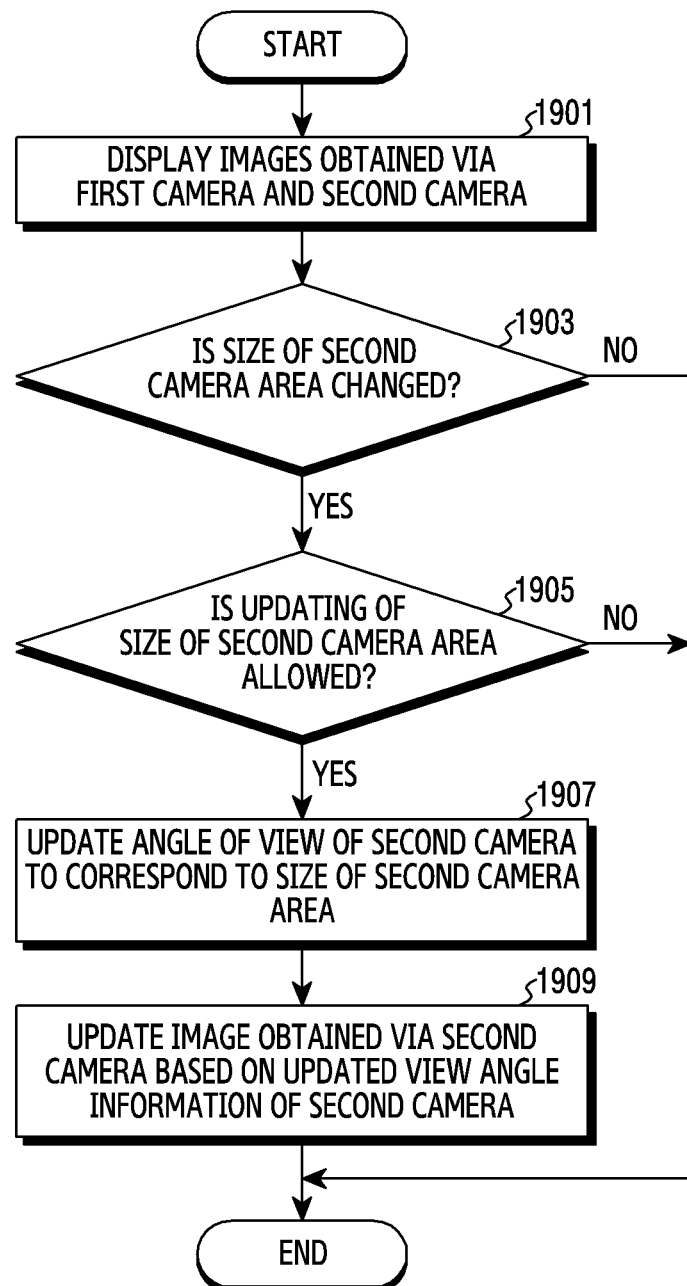
FIG. 19 is a flowchart illustrating a process by which an electronic device controls the size of a second camera area in an image obtained via a first camera according to various embodiment of the disclosure.
Figure 20A:
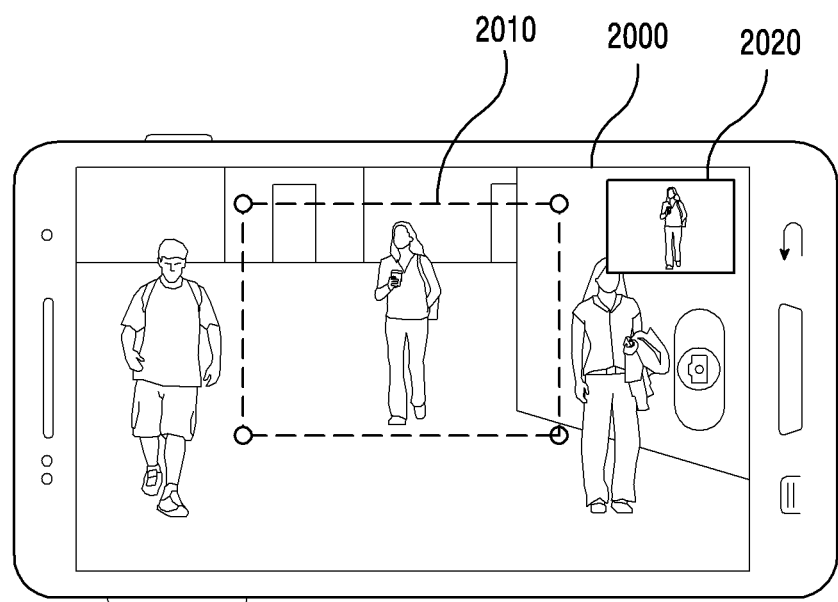
FIGS. 20A and 20B are diagrams illustrating screen configurations for controlling the size of a second camera area in an image obtained via a first camera by an electronic device according to various embodiment of the disclosure.
Figure 20B:
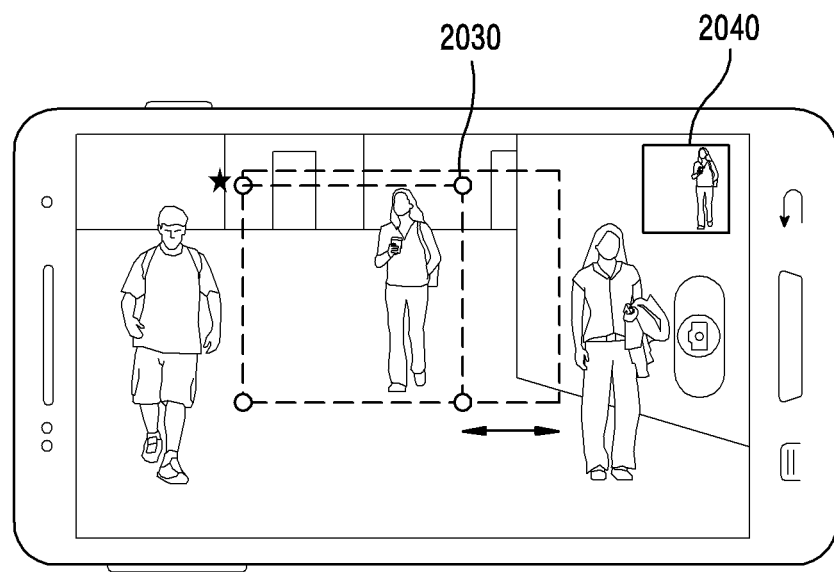

FIG. 19 is a flowchart illustrating a process by which an electronic device controls the size of a second camera area in an image obtained via a first camera according to various embodiment of the disclosure. FIGS. 20A and 20B are diagrams illustrating screen configurations for controlling the size of a second camera area in an image obtained via a first camera by an electronic device according to various embodiment of the disclosure. Hereinafter, the electronic device may include the whole or a part (e.g., the processor 220) of the electronic device 201 illustrated in FIGS. 2A and 2B.

Referring to FIG. 19, the electronic device may display, on a display, images obtained via a first camera and a second camera according to a multi-camera mode, in operation 1901. For example, the processor 220 may activate the second camera 284 on the basis of an image attribute of a second camera area in an image obtained via the first camera 282, like operations 401 to 405 of FIG. 4. When the first camera 282 and the second camera 284 are activated, the processor 220 may control the display 260 so as to display an image 2020 obtained via the second camera 284 to overlap at least a part of an image 2000 obtained via the first camera 282 as illustrated in FIG. 20A.

In operation 1903, the electronic device may determine whether the size of the second camera area is changed in the image obtained via the first camera. For example, the processor 220 may determine whether the size of a second camera area 2010 is changed on the basis of a user input 2030 to the second camera area 2010 of the image 2000 obtained via the first camera 282, as illustrated in FIG. 20B. For example, when an object (subject) on which focus is set exists in the second camera area 2010, the processor 220 may determine whether to change the size of the second camera area 2010 on the basis of the size of the object.

When the size of the second camera area is changed, the electronic device may determine whether to update the angle of view of a second camera to correspond to the size of the second camera area in operation 1905. For example, the processor 220 may compare the angle of view of a camera corresponding to the size of the second camera area and the maximum angle of view and the minimum angle of view of the second camera 284, and may determine whether updating of the angle of view of the second camera 284 is allowed. For example, when the angle of view corresponding to the size of the second camera area is greater than the maximum angle of view of the second camera 284, or is less than the minimum angle of view of the second camera 284, the processor 220 may determine that updating of the angle of view of the second camera 284 is not allowed.

When it is determined that updating of the angle of view of the second camera to correspond to the size of the second camera area is not allocated, the electronic device may output warning information in order to indicate that changing of the angle of view of the second camera is restricted. For example, the processor 220 may output warning information using at least one notification property from among a graphic, a sound, and a vibration.

When updating of the angle of view of the second camera to correspond to the size of the second camera area is allowed, the electronic device may update the angle of view of the second camera so as to correspond to the size of the second camera area in operation 1907.

In operation 1909, the electronic device may update the image that is obtained via the second camera and is displayed on the display to an image obtained at the updated angle of view of the second camera. For example, the processor 220 may control the display 260 so as to display an image 2040 that is magnified as the angle of view of the second camera 284 changes, as illustrated in FIG. 20B. For example, the processor 220 may change the magnification of an image 2040 obtained via the second camera 284 to correspond to the size ratio (a ratio of width to length) of the second camera area 2030.

Figure 21:
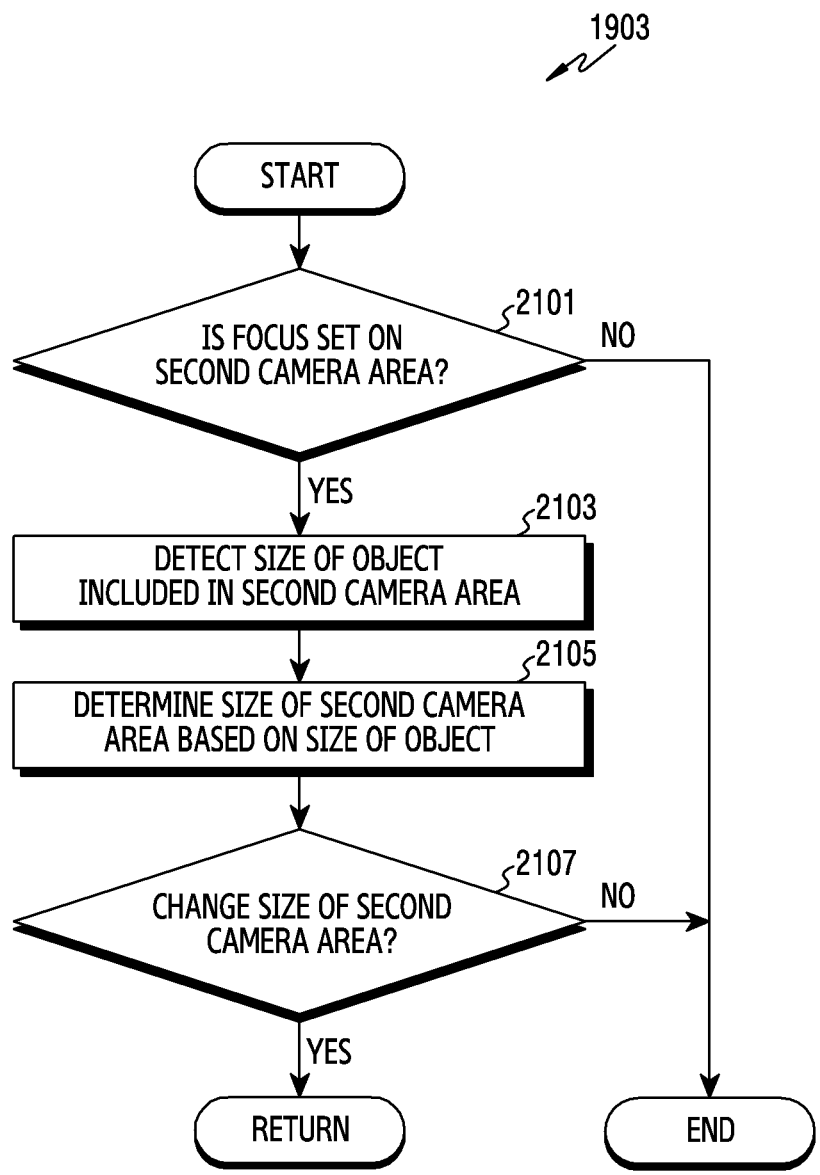
FIG. 21 is a flowchart illustrating a process by which an electronic device determines the size of a second camera area on the basis of the size of an object on which focus is set according to various embodiments of the disclosure.

FIG. 21 is a flowchart illustrating a process by which an electronic device determines the size of a second camera area on the basis of the size of an object on which focus is set according to various embodiments of the disclosure. Hereinafter, the operation of determining whether to change the size of the second camera area performed in operation 1903 of FIG. 19 will be described in detail. Hereinafter, the electronic device may include the whole or a part (e.g., the processor 220) of the electronic device 201 illustrated in FIGS. 2A and 2B.

Referring to FIG. 21, when images obtained via a first camera and a second camera are displayed on a display (e.g., operation 1901 of FIG. 19), an electronic device may determine whether focus is set on an object included in a second camera area in operation 2101.

When focus is set on the object included in the second camera area, the electronic device may detect the size of the object on which focus is set from the second camera area in operation 2103. For example, when focus is set on the object in the second camera area via the first camera 282, the processor 220 may detect the size of the corresponding object. For example, when focus is set on the object in the second camera area by the second camera 284, the processor 220 may detect the size of the corresponding object.

In operation 2105, the electronic device may determine the size of the second camera area on the basis of the size of the object on which focus is set in the second camera area. For example, the processor 220 may determine the angle of view of the second camera 284 to be close to the size of the object on which focus is set.

In operation 2107, the electronic device may determine whether to change the size of an area corresponding to the angle of view of the second camera in the image obtained via the first camera on the basis of the size of the second camera area which is determined to correspond to the size of the object on which focus is set. For example, the processor 220 may compare the size of the second camera area displayed on the display 260 and the size of the second camera area determined on the basis of the size of the object on which focus is set. For example, when the size of the second camera area displayed on the display 260 is the same as the size of the second camera area determined on the basis of the size of the object on which focus is set, the processor 220 may determine not to change the size of the second camera area displayed on the display 260. When the size of the second camera area displayed on the display 260 is different from the size of the second camera area determined on the basis of the size of the object on which focus is set, the processor 220 may determine to change the size of the second camera area displayed on the display 260.

Figure 22:
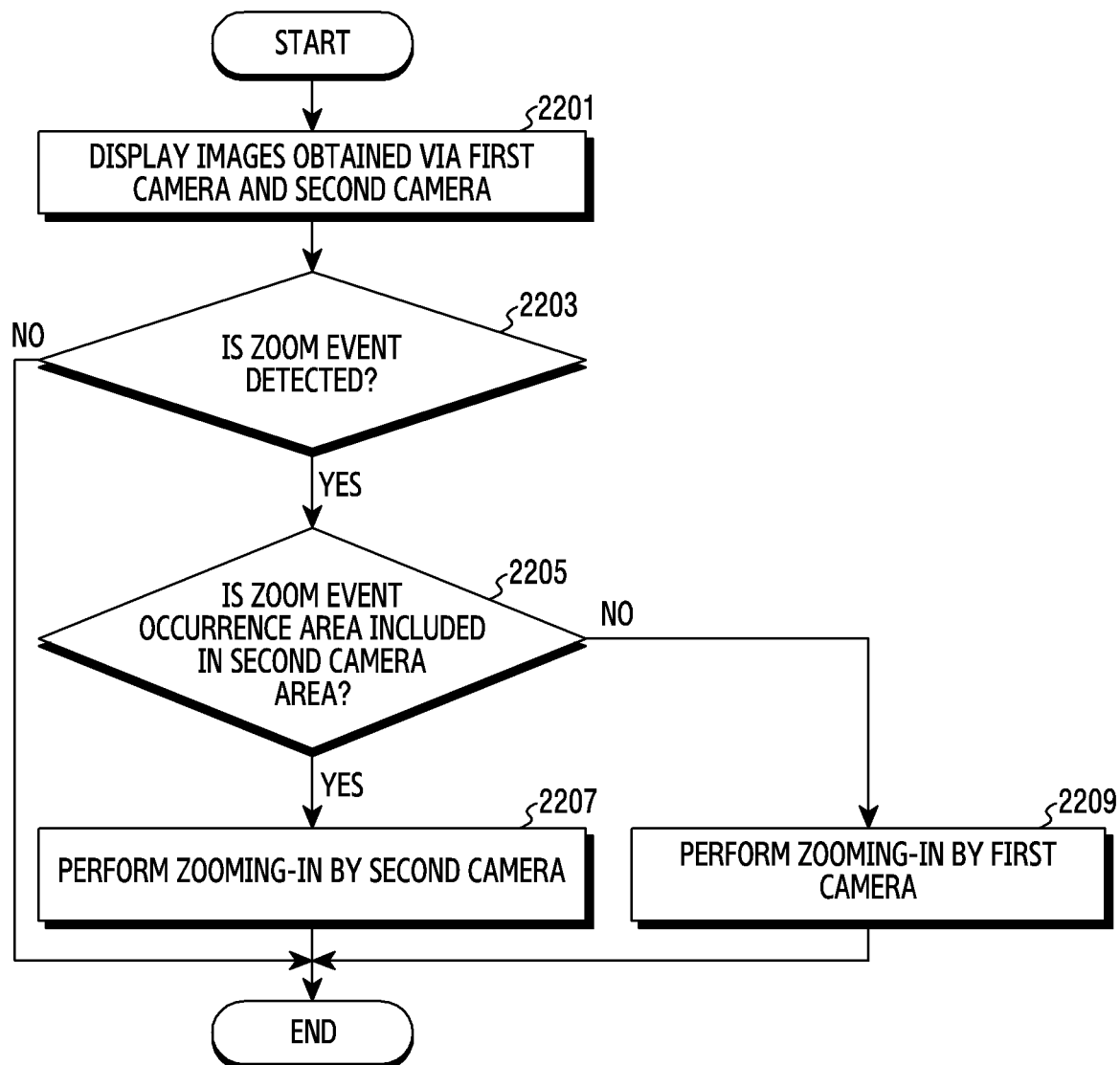
FIG. 22 is a flowchart illustrating a process of controlling a zoom function by an electronic device according to various embodiments of the disclosure.
Figure 23A:
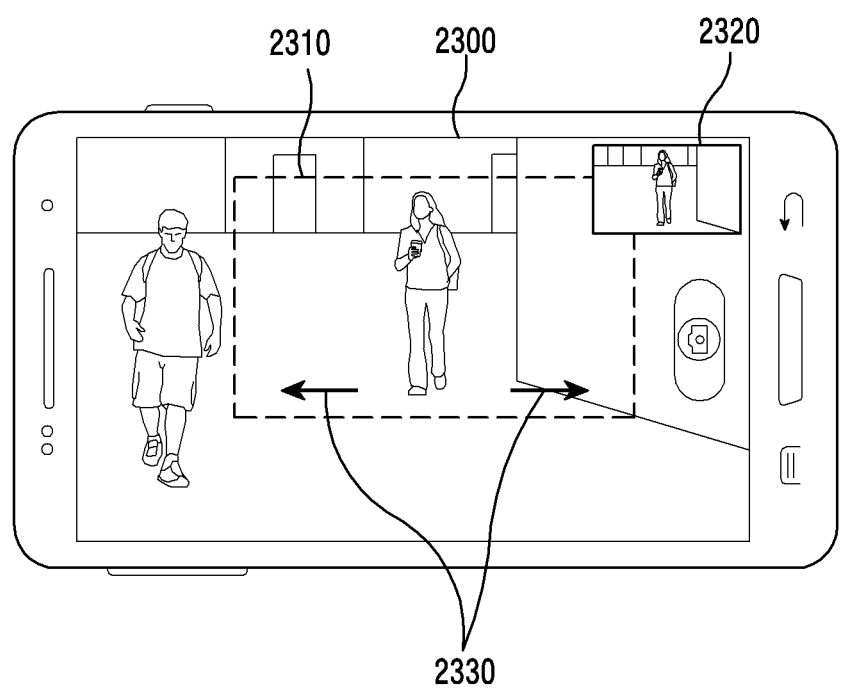
FIGS. 23A and 23B are diagrams illustrating screen configurations for controlling a zoom function of a second camera by an electronic device according to various embodiments of the disclosure.
Figure 23B:
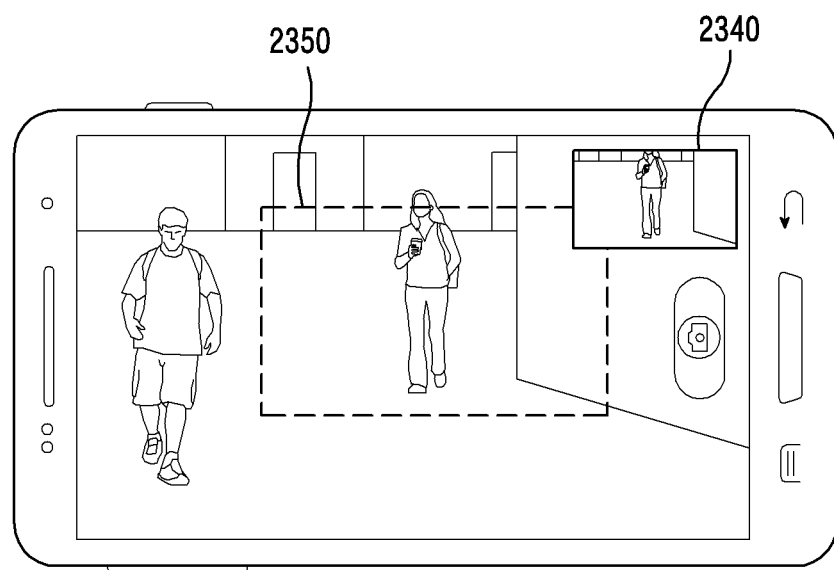
Figure 24A:
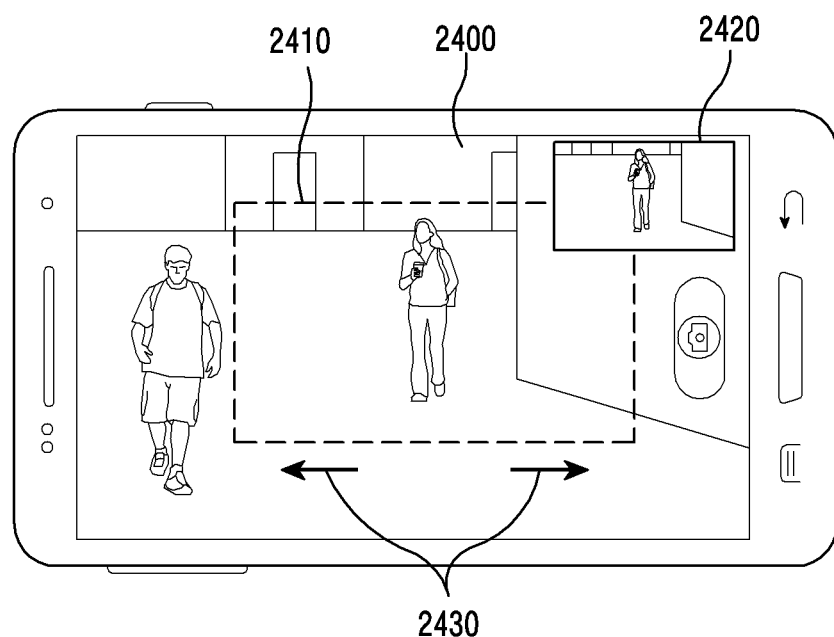
FIGS. 24A to 24C are diagrams illustrating screen configurations for controlling a zoom function of a first camera by an electronic device according to various embodiments of the disclosure.
Figure 24B:
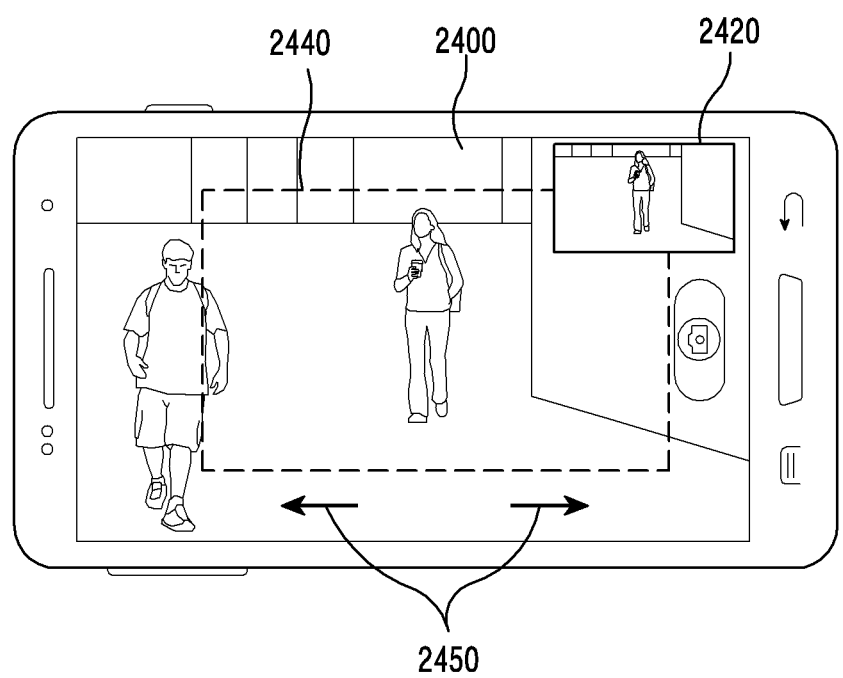
Figure 24C:
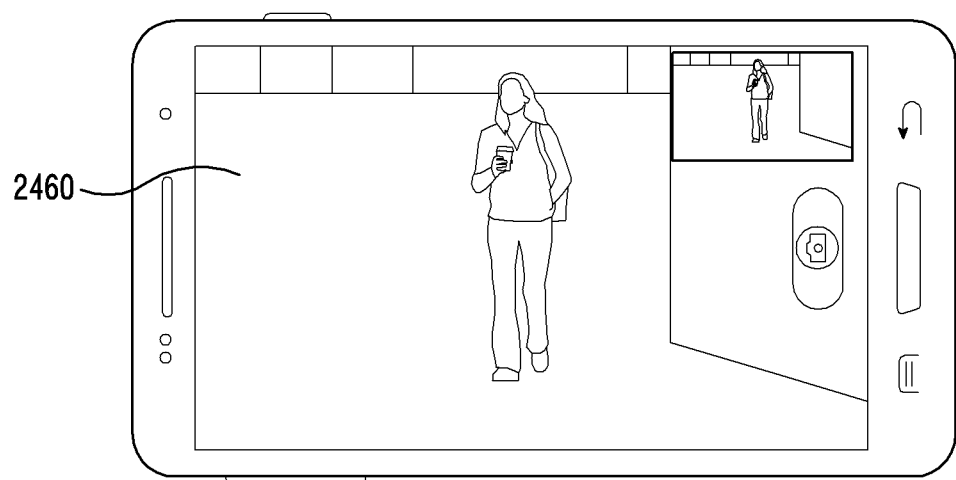

FIG. 22 is a flowchart illustrating a process of controlling a zoom function by an electronic device according to various embodiments of the disclosure. FIGS. 23A and 23B are diagrams illustrating screen configurations for controlling a zoom function of a second camera by an electronic device according to various embodiments of the disclosure. FIGS. 24A to 24C are diagrams illustrating screen configurations for controlling a zoom function of a first camera by an electronic device according to various embodiments of the disclosure. Hereinafter, the electronic device may include the whole or a part (e.g., the processor 220) of the electronic device 201 illustrated in FIGS. 2A and 2B.

Referring to FIG. 22, the electronic device may display, on a display, images obtained via a first camera and a second camera according to a multi-camera mode, in operation 2201. For example, when the first camera 282 and the second camera 284 are activated, like operations 401 to 405 of FIG. 4, the processor 220 may display an image 2300 obtained via the first camera 282 and an image 2320 obtained via the second camera 284 to be distinguished from each other, as illustrated in FIG. 23A. For example, the processor 220 may control the display 260 so as to display the image 2320 obtained via the second camera 284 to overlap at least a part of the image 2300 obtained via the first camera 282.

In operation 2203, the electronic device may determine whether occurrence of an event for controlling a zoom function is detected. For example, the processor 220 may determine whether a touch input 2330 (e.g., a drag input) for controlling the zoom function of the first camera 282 or the second camera 284 is detected, as illustrated in FIG. 23A.

When it is detected that the event for controlling the zoom function is detected, the electronic device may determine whether an event occurrence area where the event for controlling the zoom function occurs is included in a second camera area in operation 2205. For example, the processor 220 may determine whether a point at which a touch input for controlling the zoom function of a camera is detected (e.g., the start point of a drag input) is included in a second camera area 2310.

In operation 2207, when the event occurrence area where the event for controlling a zoom function occurs is included in the second camera area, the electronic device may control the zoom of the second camera to correspond to the event for controlling the zoom function. For example, when a user input 2330 for controlling a zoom function is detected within the second camera area 2310 as illustrated in FIG. 23A, the processor 220 may control the zoom of the second camera 284 to correspond to the user input 2330. For example, when the second camera 284 zooms in to correspond to the user input 2330, the processor 220 may control the display 260 so as to display an image 2340 obtained via zooming-in by the second camera 284, as illustrated in FIG. 23B. Additionally or alternatively, the processor 220 may update the size of the second camera area to correspond to a change in the angle of view which is made by zooming-in by the second camera 284, as illustrated in diagram 2350.

In operation 2209, when the event occurrence area where the event for controlling a zoom function occurs is not included in the second camera area, the electronic device may control the zoom of the first camera to correspond to the event for controlling the zoom function in operation 2209. For example, when a user input 2430 for controlling a zoom function is detected in an area remaining after excluding a second camera area 2410 from an image 2400 obtained via the first camera 282, as illustrated in FIG. 24A, the processor 220 may control the zoom of the first camera 282 to correspond to the user input 2430. For example, when the first camera 282 zooms in to correspond to the user input 2430, the processor 220 may control the display 260 so as to display an image obtained via zooming-in by the first camera 282, as illustrated in FIG. 24B. In this instance, an area corresponding to the angle of view of the second camera 284 is magnified by zooming-in by the first camera 282, and thus, the processor 220 may update the size of the second camera area as illustrated in diagram 2440. Additionally or alternatively, when a user input 2450 for controlling a zoom function is detected in an area remaining after excluding a second camera area 2440 from the image 2400 obtained via the first camera 282, as illustrated in FIG. 24B, the processor 220 may enable the first camera 282 to zoom in to correspond to the user input 2450 as illustrated in FIG. 24C. In this instance, the processor 220 may set the angle of view of the first camera 282 associated with zooming-in by the first camera 282 and the angle of view of the second camera 284 to be the same as each other as illustrated in diagram 2460.

Figure 25A:
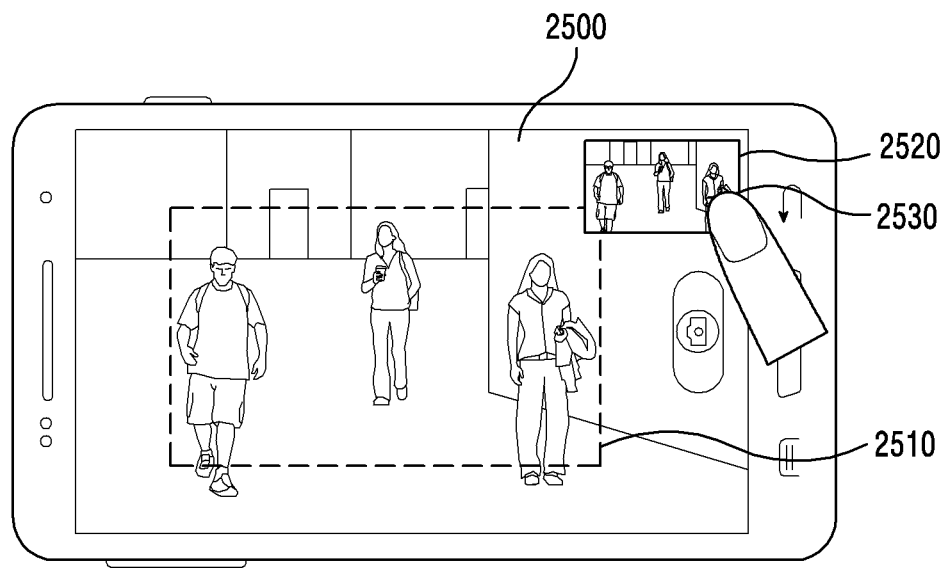
FIGS. 25A and 25B are diagrams illustrating screen configurations for changing a display area of a camera by an electronic device according to various embodiments of the disclosure.
Figure 25B:
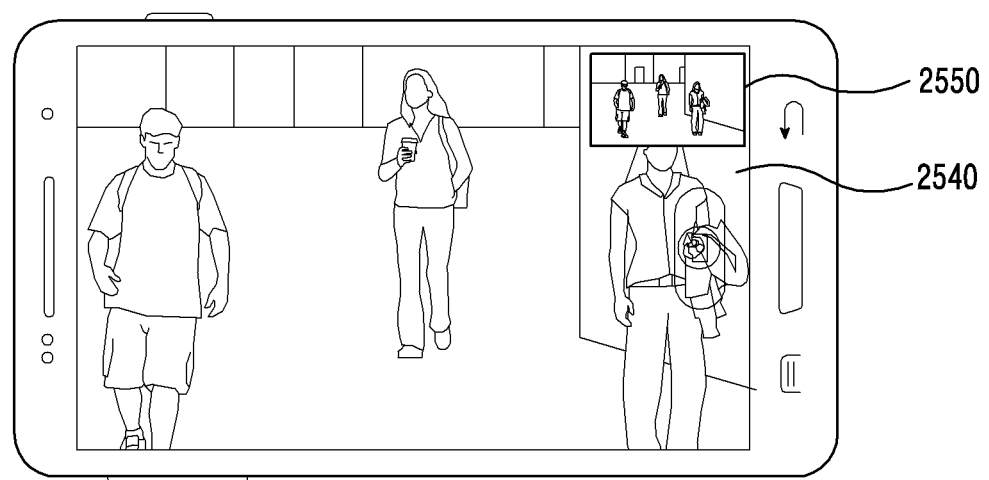

FIGS. 25A and 25B are diagrams illustrating screen configurations for changing a display area of a camera by an electronic device according to various embodiments of the disclosure. Hereinafter, the electronic device may include the whole or a part (e.g., the processor 220) of the electronic device 201 illustrated in FIGS. 2A and 2B.

According to an embodiment, the electronic device may display, on a display, images obtained via a first camera and a second camera according to a multi-camera mode. For example, when the first camera 282 and the second camera 284 are activated, the processor 220 may control the display 260 so as to display an image 2520 obtained via the second camera 284 to overlap at least a part of an image 2500 obtained via the first camera 282 as illustrated in FIG. 25A.

According to an embodiment, when a user input to the image obtained via the second camera is detected, the electronic device may change areas where the images obtained by the first camera and the second camera are displayed. For example, when a touch input 2530 to the image 2520 obtained via the second camera 284 is detected as illustrated in FIG. 25A, the processor 220 may change the display area for the image 2500 obtained via the first camera 282 and the display area for the image 2520 obtained via the second camera 284. For example, the processor 220 may control the display 260 so as to display an image 2550 obtained via the first camera 282 to overlap at least a part of an image 2540 obtained via the second camera 284, as illustrated in FIG. 25B.

According to various embodiments of the disclosure, an operation method of an electronic device may include: an operation of displaying a first image obtained via a first camera of the electronic device on a display of the electronic device; an operation of detecting, from the first image, information corresponding to a second camera configured to have an angle of view included in an angle of view of the first camera; an operation of activating the second camera when determining to activate the second camera based on the information corresponding to the second camera; and an operation of displaying, on the display, at least one image corresponding to activation of the first camera and the second camera.

According to various embodiments, the method may further include an operation of activating the first camera and setting the second camera to operate in an idle mode when a multi-camera mode is set.

According to various embodiments, the operation of activating the second camera may include an operation of activating the second camera that currently operates in the idle mode when it is determined to activate the second camera on the basis of the information corresponding to the second camera.

According to various embodiments, the operation of activating the second camera may include: an operation of detecting an image attribute of an area corresponding to the angle of view of the second camera from the first image obtained via the first camera; an operation of determining whether to activate the second camera based on the image attribute; and an operation of activating the second camera when determining to activate the second camera.

According to various embodiments, the image attribute may include at least one from among face detection information of the area corresponding to the angle of view of the second camera, exposure information (a brightness value) of the area corresponding to the angle of view of the second camera, and focus information of an object included in the area corresponding to the angle of view of the second camera.

According to various embodiments, the operation of activating the second camera may include: an operation of detecting the face of an object from the first image obtained via the first camera; an operation of determining the validity of a facial area of the object detected from an area corresponding to the angle of view of the second camera when the facial area of the object detected from the area corresponding to the angle of view of the second camera exists in the first image; and an operation of activating the second camera when it is determined that the facial area of the object detected from the area corresponding to the angle of view of the second camera is valid.

According to various embodiments, the operation of determining the validity of the facial area may include: an operation of determining the validity of the facial area of the object detected from the area corresponding to the angle of view of the second camera on the basis of the size of the facial area of the object detected from the area corresponding to the angle of view of the second camera.

According to various embodiments, the operation of activating the second camera may include: an operation of identifying the brightness value of the area corresponding to the angle of view of the second camera in the first image; and an operation of activating the second camera when the difference in brightness value between the area corresponding to the angle of view of the second camera in the first image and the remaining area exceeds a reference value.

According to various embodiments, the operation of activating the second camera may include: an operation of determining whether an object on which focus is set exists in the area corresponding to the angle of view of the second camera in the first image obtained via the first camera; and an operation of activating the second camera when the object on which the focus is set exists in the area corresponding to the angle of view of the second camera.

According to various embodiments, the operation of displaying the at least one object may include an operation of modifying the form of a capture icon so as to correspond to the activation of the first camera and the second camera when the second camera is activated.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 230) in the form of a program module. The instruction, when executed by a processor (e.g., the processor 220 or 520), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted.

Operations performed by a module, a programming module, or other elements according to various embodiments may be executed sequentially, in parallel, repeatedly, or in a heuristic manner. At least some operations may be executed according to another sequence, may be omitted, or may further include other operations.

The embodiments disclosed herein are proposed to help with description and comprehension of disclosed technical contents, and do not limit the scope of various embodiments of the disclosure. Therefore, the scope of the various embodiments of the disclosure should be construed as including all modifications or various other embodiments based on the spirit and scope of the various embodiments of the disclosure.

The invention claimed is:

1. An electronic device, comprising:
a first camera;
a second camera having an angle of view set to be included in an angle of view of the first camera;
a display; and
a processor configured to:
set a multi-camera mode, wherein the first camera is activated and the second camera operates in an idle mode, wherein the second camera in the idle mode performs initial setting of the second camera and controls an image sensor of the second camera to maintain a deactivated state,
obtain a first image via the first camera,
display, on the display, the first image obtained via the first camera,
determine whether information is detected in the first image which corresponds to the second camera, and
when the information detected in the first image is determined to correspond to the second camera:
activate the second camera, wherein the information is determined to correspond to the second camera based on a determination that an image attribute in the first image obtained via the first camera corresponds to an image area of the second camera,
display, on the display, at least one object corresponding to activation of the first camera and the second camera, and
when the information detected in the first image is determined not to correspond to the second camera, maintaining the second camera in the deactivated state while the first camera is activated in the multi-camera mode.

2. The electronic device of claim 1, wherein the initial setting of the second camera includes at least one of generating an instance associated with the second camera, allocating memory for driving the second camera, and/or reading, from the memory, a setting parameter for operating a camera.

3. The electronic device as claimed in claim 1, wherein, when determining to activate the second camera, the processor is further configured to activate the second camera that currently operates in the idle mode.

4. The electronic device as claimed in claim 1, wherein, the processor is further configured to:
detect the image attribute in an area corresponding to the angle of view of the second camera from the first image obtained via the first camera, and
determine whether to activate the second camera based on the image attribute.

5. The electronic device as claimed in claim 4, wherein the image attribute comprises at least one from among face detection information of the area corresponding to the angle of view of the second camera, exposure information (a brightness value) of the area corresponding to the angle of view of the second camera, or focus information of an object included in the area corresponding to the angle of view of the second camera.

6. The electronic device as claimed in claim 1, wherein the processor is further configured to:
detect a face of an object from the first image obtained via the first camera,
determine a validity of a facial area of the object detected from an area corresponding to the angle of view of the second camera when the facial area of the object detected from the area corresponding to the angle of view of the second camera exists in the first image, and
activate the second camera when determining that the facial area of the object detected from the area corresponding to the angle of view of the second camera is valid.

7. The electronic device as claimed in claim 1, wherein the processor is further configured to:
identify a brightness value of an area corresponding to the angle of view of the second camera in the first image, and
activate the second camera when a difference in brightness value between the area corresponding to the angle of view of the second camera and a remaining area exceeds a reference value.

8. The electronic device as claimed in claim 1, wherein the processor is further configured to:
identify whether an object on which focus is set exists in an area corresponding to the angle of view of the second camera in the first image obtained via the first camera, and
activate the second camera when the object on which the focus is set exists in the area corresponding to the angle of view of the second camera.

9. The electronic device as claimed in claim 1, wherein, when the second camera is activated, the processor is further configured to modify a form of a capture icon so as to correspond to the activation of the first camera and the second camera.

10. The electronic device as claimed in claim 1, wherein the first camera and the second camera are disposed to be close to each other in the same side of the electronic device.

11. An operation method of an electronic device, the method comprising:

setting a multi-camera mode, wherein a first camera is activated and a second camera operates in an idle mode, wherein the second camera in the idle mode performs initial setting of the second camera and controls an image sensor of the second camera to maintain a deactivated state;

obtaining a first image via the first camera;

displaying the first image obtained via a first camera on a display of the electronic device;

determining whether information is detected in the first image which corresponds to the second camera configured to have an angle of view included in an angle of view of the first camera; and when the information detected in the first image is determined to correspond to the second camera:

activating the second camera, wherein the information is determined to correspond to the second camera based on a determination that an image attribute in the first image obtained via the first camera corresponds to an image area of the second camera;

displaying, on the display, at least one image corresponding to activation of the first camera and the second camera; and when the information detected in the first image is determined not to correspond to the second camera, maintaining the second camera in the deactivated state while the first camera is activated in the multi-camera mode.

12. The method as claimed in claim 11, wherein the initial setting of the second camera includes at least one of generating an instance associated with the second camera, allocating memory for driving the second camera, and/or reading, from the memory, a setting parameter for operating a camera.

13. The method as claimed in claim 11, wherein the activating of the second camera comprises:

detecting the image attribute in an area corresponding to the angle of view of the second camera from the first image obtained via the first camera;

determining whether to activate the second camera based on the image attribute; and activating the second camera when determining to activate the second camera.

14. The method as claimed in claim 13, wherein the image attribute comprises at least one from among face detection information of the area corresponding to the angle of view of the second camera, exposure information (a brightness value) of the area corresponding to the angle of view of the second camera, or focus information of an object included in the area corresponding to the angle of view of the second camera.

15. The method as claimed in claim 11, wherein the activating of the second camera comprises:

detecting a face of an object from the first image obtained via the first camera;

determining a validity of a facial area of the object detected from an area corresponding to the angle of view of the second camera when the facial area of the object detected from the area corresponding to the angle of view of the second camera exists in the first image; and activating the second camera when determining that the facial area of the object detected from the area corresponding to the angle of view of the second camera is valid.

16. The method as claimed in claim 11, wherein the activating of the second camera comprises:

identifying a brightness value of an area corresponding to the angle of view of the second camera in the first image; and activating the second camera when a difference in brightness value between the area corresponding to the angle of view of the second camera and a remaining area exceeds a reference value.

17. The method as claimed in claim 11, wherein the activating of the second camera comprises, when determining to activate the second camera, activating the second camera that currently operates in the idle mode.

18. The method as claimed in claim 11, wherein the activating of the second camera comprises:

identifying whether an object on which focus is set exists in an area corresponding to the angle of view of the second camera in the first image obtained via the first camera; and activating the second camera when the object on which the focus is set exists in the area corresponding to the angle of view of the second camera.

19. The method as claimed in claim 11, further comprising, when the second camera is activated, modifying a form of a capture icon so as to correspond to the activation of the first camera and the second camera.

20. The method as claimed in claim 11, wherein the first camera and the second camera are disposed to be close to each other in the same side of the electronic device.

* * * * *